United States Patent
Husain

(10) Patent No.: US 12,028,095 B2
(45) Date of Patent: Jul. 2, 2024

(54) MACHINE-LEARNING BASED ANALYSIS AND RESPONSE TO ELECTROMAGNETIC WAVEFORMS

(71) Applicant: SparkCognition, Inc., Austin, TX (US)

(72) Inventor: Syed Mohammad Amir Husain, Georgetown, TX (US)

(73) Assignee: SPARKCOGNITION, INC., Austin, TX (US)

(*) Notice: Subject to any disclaimer, the term of this patent is extended or adjusted under 35 U.S.C. 154(b) by 254 days.

(21) Appl. No.: 17/467,922

(22) Filed: Sep. 7, 2021

(65) Prior Publication Data

US 2022/0077878 A1 Mar. 10, 2022

Related U.S. Application Data

(60) Provisional application No. 63/075,939, filed on Sep. 9, 2020.

(51) Int. Cl.
*H04B 1/00* (2006.01)
*G06N 20/00* (2019.01)
*H04B 1/713* (2011.01)
*H04K 3/00* (2006.01)

(52) U.S. Cl.
CPC .......... *H04B 1/0003* (2013.01); *G06N 20/00* (2019.01); *H04B 1/713* (2013.01); *H04K 3/25* (2013.01); *G06F 2218/10* (2023.01)

(58) Field of Classification Search
CPC ...... H04B 1/0003; H04B 1/713; H04B 1/715; G06N 20/00; G06N 3/044; G06N 3/045; G06N 3/048; G06N 5/01; G06N 3/084; G06N 3/126; G06N 20/10; H04K 3/25; G06F 2218/10

USPC .......................................................... 375/316
See application file for complete search history.

(56) References Cited

U.S. PATENT DOCUMENTS

| | | | |
|---|---|---|---|
| 7,581,543 | B2 | 9/2009 | McGrath et al. |
| 10,003,483 | B1 | 6/2018 | Migliori et al. |
| 10,581,469 | B1 | 3/2020 | O'Shea et al. |
| 10,749,594 | B1 | 8/2020 | O'Shea et al. |
| 10,749,882 | B2 | 8/2020 | Grothendieck et al. |
| 10,892,786 | B1 | 1/2021 | Pratt et al. |
| 10,944,440 | B2 | 3/2021 | Calabro et al. |
| 10,956,807 | B1 | 3/2021 | Abeloe |
| 10,979,202 | B2 | 4/2021 | Ge et al. |
| 11,082,149 | B2 | 8/2021 | Hoydis et al. |

(Continued)

OTHER PUBLICATIONS

Jagannath, Jithin et al., "Framework for Automatic Signal Classification Techniques (FACT) for Software Defined Radios," IEEE, 2015, pp. 1-7.

(Continued)

*Primary Examiner* — Fitwi Y Hailegiorgis
(74) *Attorney, Agent, or Firm* — Moore IP Law

(57) ABSTRACT

A method includes determining, based at least in part on parameters of a software-defined radio (SDR), waveform data descriptive of an electromagnetic waveform. The method also includes generating feature data based on the waveform data and based on one or more symbols decoded from the electromagnetic waveform. The method further includes providing the feature data as input to a first machine-learning model and initiating a response action based on an output of the first machine-learning model.

21 Claims, 14 Drawing Sheets

(56) References Cited

U.S. PATENT DOCUMENTS

| | | |
|---|---|---|
| 11,152,016 B2 | 10/2021 | Lawson et al. |
| 11,349,743 B2 | 5/2022 | Kleider et al. |
| 11,366,434 B2 | 6/2022 | Abeloe |
| 11,403,862 B2 | 8/2022 | Jackson et al. |
| 11,443,167 B2 | 9/2022 | Govea et al. |
| 11,651,522 B2 | 5/2023 | Zhao et al. |
| 11,663,479 B2 | 5/2023 | Lee et al. |
| 2011/0143811 A1* | 6/2011 | Rodriguez ......... H04N 1/00244 455/556.1 |
| 2017/0243139 A1 | 8/2017 | Dzierwa et al. |
| 2019/0073602 A1 | 3/2019 | Willner |
| 2019/0258953 A1 | 8/2019 | Lang et al. |
| 2021/0306081 A1 | 9/2021 | Sadhu et al. |
| 2021/0383199 A1 | 12/2021 | Weissenborn et al. |
| 2022/0022797 A1 | 1/2022 | Fujimori et al. |
| 2022/0044688 A1 | 2/2022 | Perret et al. |
| 2022/0050133 A1 | 2/2022 | Newman et al. |
| 2022/0077878 A1 | 3/2022 | Husain |
| 2022/0077951 A1 | 3/2022 | Husain |

OTHER PUBLICATIONS

McClintick, Kyle W. "Training Data Generation Framework For Machine-Learning Based Classifiers," Worcester Polytechnic Institute, Digital WPI, Masters Theses, Dec. 14, 2018, pp. 1-169.

O'Shea, Timothy J. et al., "Practical Signal Detection and Classification in GNU Radio," Proceedings of the SDR 07 Technical Conference and Product Exposition, 2007, pp. 1-6.

Stebel, Jakub et al., "Neural Network Classification of SDR Signal Modulation," 15th IFIP International Conference on Computer Information Systems and Industrial Management (CISIM), Sep. 2016, Vilnius, Lithuania. pp. 160-171.

* cited by examiner

MACHINE-LEARNING BASED ANALYSIS AND RESPONSE TO ELECTROMAGNETIC WAVEFORMS

CROSS-REFERENCE TO RELATED APPLICATION

The present application claims priority from U.S. Provisional Application No. 63/075,939 filed Sep. 9, 2020, entitled "MACHINE-LEARNING BASED ANALYSIS AND RESPONSE TO ELECTROMAGNETIC WAVEFORMS," which is incorporated by reference herein in its entirety.

BACKGROUND

Conventionally, radio receivers and transmitters have included adjustable components (such as a variable capacitor and or a variable inductor) within otherwise static circuits. Such radios are "tunable" to monitor different channels (e.g., ranges of frequencies) but are otherwise fixed. For example, the size (bandwidth) of each channel is generally fixed, as is the type of modulation the radio receiver decodes or the radio transmitter encodes. Because the circuits in such conventional radios are rather inflexible, each radio receiver/transmitter in a conventional radio is generally configured to work with a single communication protocol and is able to monitor only a small part of an electromagnetic spectrum at any particular time.

SUMMARY

The present disclosure describes applications that use software-defined radio (SDR), in combination with machine learning, to enable flexible scanning of an electromagnetic spectrum and taking various actions in response to detected electromagnetic waveforms.

A particular aspect of the disclosure describes a method that includes determining, based at least in part on parameters of a software-defined radio (SDR), waveform data descriptive of an electromagnetic waveform and generating feature data based on the waveform data and based on one or more symbols decoded from the electromagnetic waveform. The method also includes providing the feature data as input to a machine-learning model and initiating a response action based on an output of the machine-learning model. A system for performing the method and computer-readable media storing instructions to perform the method are also described.

Another aspect of the disclosure describes a method that includes determining, based at least in part on parameters of a software-defined radio (SDR), waveform data descriptive of an electromagnetic waveform and generating feature data based on the waveform data. The method also includes providing the feature data as input to a first machine-learning model to predict a future action of a device associated with at least a portion of the electromagnetic waveform and initiating a response action based on the predicted future action. A system for performing the method and computer-readable media storing instructions to perform the method are also described.

Another aspect of the disclosure describes a method that includes determining, based at least in part on parameters of a software-defined radio (SDR), waveform data descriptive of an electromagnetic waveform. The method also includes obtaining sensor data distinct from the waveform data and generating feature data based on the sensor data and the waveform data. The method further includes providing the feature data as input to a first machine-learning model and initiating a response action based on an output of the first machine-learning model. A system for performing the method and computer-readable media storing instructions to perform the method are also described.

The features, functions, and advantages described herein can be achieved independently in various implementations or may be combined in yet other implementations, further details of which can be found with reference to the following description and drawings.

DETAILED DESCRIPTION

Figure 1:
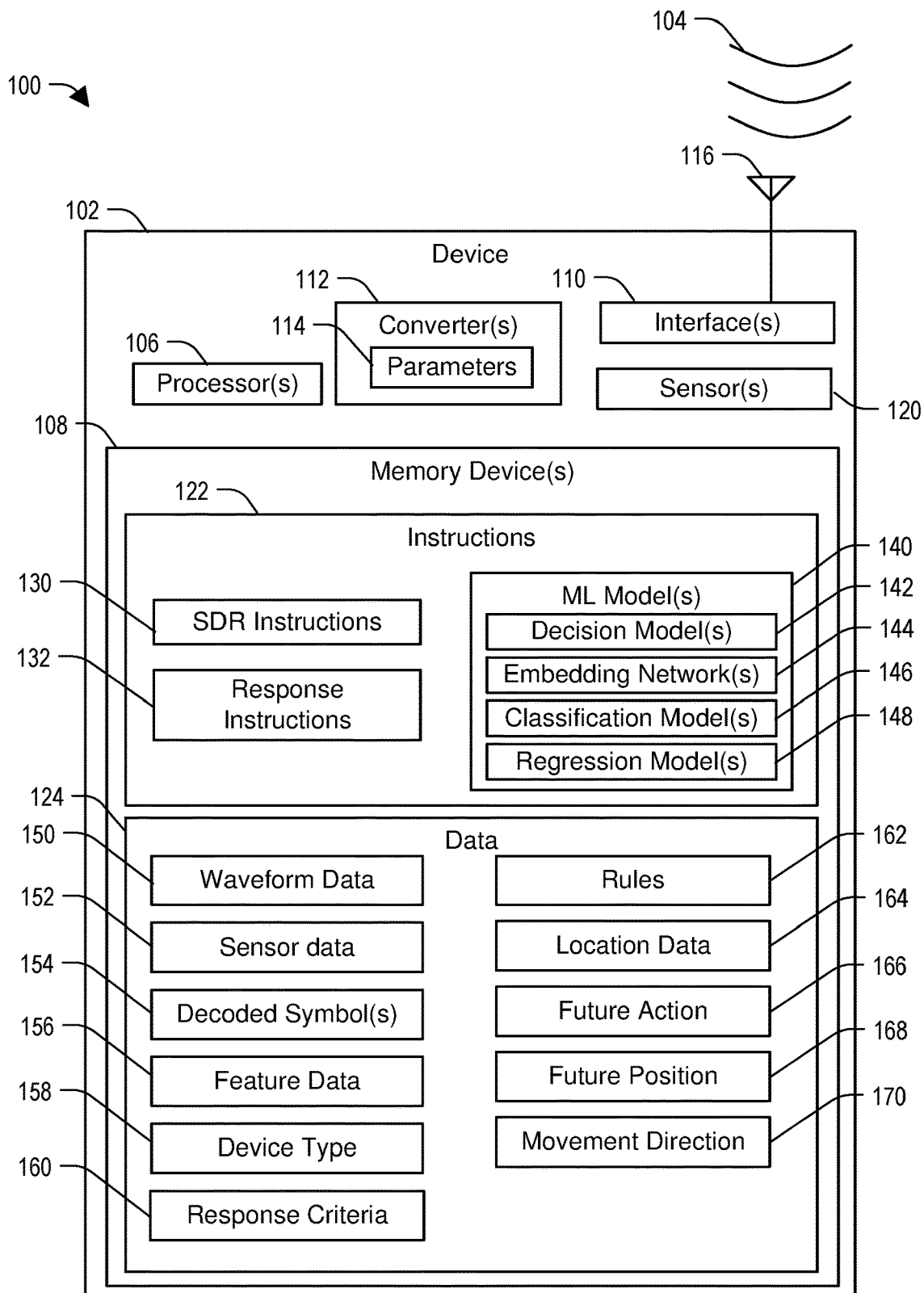
FIG. 1 is a block diagram of an example of a system that includes a device configured to detect ambient electromagnetic waveforms and to initiate response actions based on characteristics of the electromagnetic waveforms according to a particular aspect.

Aspects described herein use software-defined radio (SDR) in combination with machine learning to enable monitoring an electromagnetic spectrum, or portions thereof, for emissions from particular device or device types and acting in response. For example, one or more machine-learning models are trained to identify electromagnetic waveforms emitted by various types of devices, including transmitters and/or electromechanical devices. To illustrate, time series data representing features of an electromagnetic waveform associated with a particular type of device can be used to train a machine-learning model to classify received waveforms or device types associated with the received waveforms. The features can include, for example, features of a signal (if one is present in the electromagnetic waveform), metadata about or included as part of the signal (e.g., date, time, location, frequency band, unencrypted header if a digital signal, payload length, etc.), one or more symbols decoded from the signal, etc. The features can also, or in the alternative, be descriptive of the electromagnetic waveform itself, such as amplitude or frequency descriptors.

A device that includes an SDR system and one or more trained models can be used to monitor an electromagnetic environment. To illustrate, the device can be included within or coupled to an unmanned vehicle (such as an unmanned aerial vehicle) and used to map electromagnetic emissions within a geographic area. As another example, the device could be used to search for particular types of electromagnetic emitters. To illustrate, in a region experiencing civil unrest, the device can be used to detect transmitters being used in a particular area to detonate explosive devices.

In some examples, the device could be used with other systems or devices to perform electronic counter operations or electromagnetic warfare (sometimes referred to as "cognitive electronic warfare"). For example, an unmanned vehicle equipped with the device may transmit a jamming signal in response to detecting a particular transmitting device or a particular type of transmitting device based on an electromagnetic signature of the transmitting device. As another example, the unmanned vehicle (or device therein) may transmit a spoofing signal in response to detecting a particular transmitting device or a particular type of transmitting device. As yet another example, multiple unmanned vehicles can cooperate as a swarm to form a physical obstruction between the transmitting device and another device (e.g., a target device or a protected device).

In some implementations, the SDR system is used in combination with or cooperatively with one or more sensors. To illustrate, the device can communicate with, be coupled to, or include sensors that work cooperatively with the SDR system to classify sources of electromagnetic waveforms. For example, a particular sensor (such as a camera or an audio transducer) can be triggered to capture sensor data responsive to the SDR system detecting an electromagnetic waveform of interest. In this example, both the sensor data and data representing the electromagnetic waveform can be provided to the trained model(s) to classify a source of the electromagnetic waveform. In another example, a sensor can capture sensor data continuously or occasionally irrespective of the SDR system, and the sensor data and output of the SDR system can be provided as input to the trained model(s) continuously or occasionally to detect sources of interest.

Combinations of these various aspects are also disclosed. For example, when operating cooperatively, a first device can use an SDR system to detect an electromagnetic waveform and a second device can use a sensor to capture sensor data. The sensor data and data representing the electromagnetic waveform can be analyzed by a trained model onboard a third device. Based on a classification result provided by the trained model, one or more devices (including the first device, the second device, the third device, another device, or a combination thereof) can initiate a response action.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 is a diagram of an example of a system 100 that includes a device 102 configured to detect ambient electromagnetic waveforms (e.g., representative electromagnetic waveform 104) and to initiate response actions based on characteristics of the electromagnetic waveforms (possibly in combination with other data). In FIG. 1, the device 102 includes one or more interfaces 110, one or more converters 112, one or more processors 106, one or more memory devices 108, and one or more sensors 120. In other implementations, the device 102 includes more or fewer components than illustrated in FIG. 1. For example, in some implementations, the device 102 also includes one or more other input or output devices, such as a display, a keyboard, or a network interface port, as non-limiting examples. In another example, in some implementations, the converter(s)

112 and the interface(s) 110 are combined in a single module or circuit (e.g. a radio circuit). In still other examples, the sensor(s) 120 are omitted, or are external to and/or independent of the device 102.

The memory device(s) 108 store instructions 122 and data 124. The instructions 122 are executable by the processor(s) 106 to initiate, control, or perform one or more operations of the device 102. For example, the instructions 122 include SDR instructions 130 that are executable by the processor(s) 106 to operate a software defined radio in conjunction with the interface(s) 110 and the converter(s) 112, as described further below. In addition to the SDR instructions 130, the instructions 122 stored in the memory device(s) 108 include response instructions 132 that are executable to select a response action based on at least a portion of the electromagnetic waveform 104, to control a response of the device 102 based on at least a portion of the electromagnetic waveform 104, to control responses of one or more other devices based on at least a portion of the electromagnetic waveform 104, or a combination thereof. As explained below, the response action may be selected based on one or more machine learning models that operate on data generated by SDR processing of the electromagnetic waveform 104. FIGS. 2-8 illustrate various aspects of execution of the SDR instructions 130 and the response instructions 132.

The sensor(s) 120 include, for example, a global positioning system (GPS) receiver, a local positioning system sensor, a dead-reckoning sensor, a camera, a ranging sensor (e.g., radar or lidar), an acoustic sensor (e.g., audio transducers, microphones, or hydrophones), another type of sensor, or any combination thereof. In some implementations, the device 102 is configured to cause the sensor(s) 120 to generate or capture (e.g., sample and store) sensor data 152 responsive to the electromagnetic waveform 104. For example, a camera of the sensor(s) 120 can capture image or video data of a particular area in response to a device type 158 associated with the electromagnetic waveform 104 satisfying a particular criterion.

The interface(s) 110 are configured to receive the electromagnetic waveform 104 via one or more antennas 116 coupled to the interface(s) 110. In some implementations, the interface(s) 110 include or correspond to simple coupling device(s) (e.g., coaxial couplers, baluns, and matching networks, etc.). In other implementations, the interface(s) 110 include more complex antenna control systems (e.g., a beamforming circuit to control a phased array antenna). Although FIG. 1 illustrates the interface(s) 110 coupled to antenna(s) 116, in other implementations, the interface(s) 110 are coupled to other types of devices to receive particular frequencies of electromagnetic radiation. To illustrate, a photodetector may be used to generate an electrical signal response to electromagnetic radiation in a visible or near-visible light frequency range.

The converter(s) 112 are configured to process the received electromagnetic waveform 104 based on software-defined radio parameters 114 ("parameters" in FIG. 1) that may be set by the processor(s) 106 while executing the SDR instructions 130. For example, the converter(s) 112 generate a digital representation of at least a portion of the electromagnetic waveform 104. The converter(s) 112 include, for example, amplifier circuitry, filters, demodulation circuitry, oscillators, analog-to-digital converters (ADC), and/or other circuitry or components, which together can be referred to as receiver circuitry. In some implementations, the converter(s) 112 are also configured to process data from the processor(s) 106 to generate a signal to be transmitted via the antenna(s) 116. In such implementations, the converter(s) 112 include amplifier circuitry, filters, modulation circuitry, oscillators, digital-to-analog converters (DAC), and/or other circuitry or components, which together can be referred to as transmitter circuitry.

As explained further below, the processor(s) 106, while executing the SDR instructions 130, generate signals indicating the parameters 114 to control the converter(s) 112. To illustrate, the converter(s) 112 can include one or more filters, and a specific frequency range of the electromagnetic waveform 104 that the filter(s) allow to pass is controlled based on the parameters 114 specified by the processor(s) 106 executing the SDR instructions 130. As another example, the interface(s) 110 can include beamforming circuitry, and the parameters 114 can indicate beamforming parameters used by the beamforming circuitry.

During operations, the processor(s) 106 executing the SDR instructions 130 select the parameters 114 to cause the converter(s) 112 to scan an electromagnetic spectrum for electromagnetic waveforms of interest. In some implementations, the device 102 includes multiple sets of converter(s) 112 that operate concurrently using different sets of parameters 114 to scan the electromagnetic spectrum. For example, the antenna(s) 116 can receive ambient electromagnetic waveform(s) and generate electrical signals based on the received waveforms. The electrical signals may be replicated or divided (e.g., by the interface(s) 110), with each copy or subset of the electrical signals sent to a corresponding set of converters 112. Using multiple sets of converters 112 in this way enables the device 102 to search the electromagnetic spectrum for multiple types of waveforms of interest, such as signals in different channels, signals encoded using different protocol stacks, waveforms of interest that do not encode signals (e.g. waveforms generated as a byproduct of operation of an electromechanical or electrical device), etc.

Figure 2:
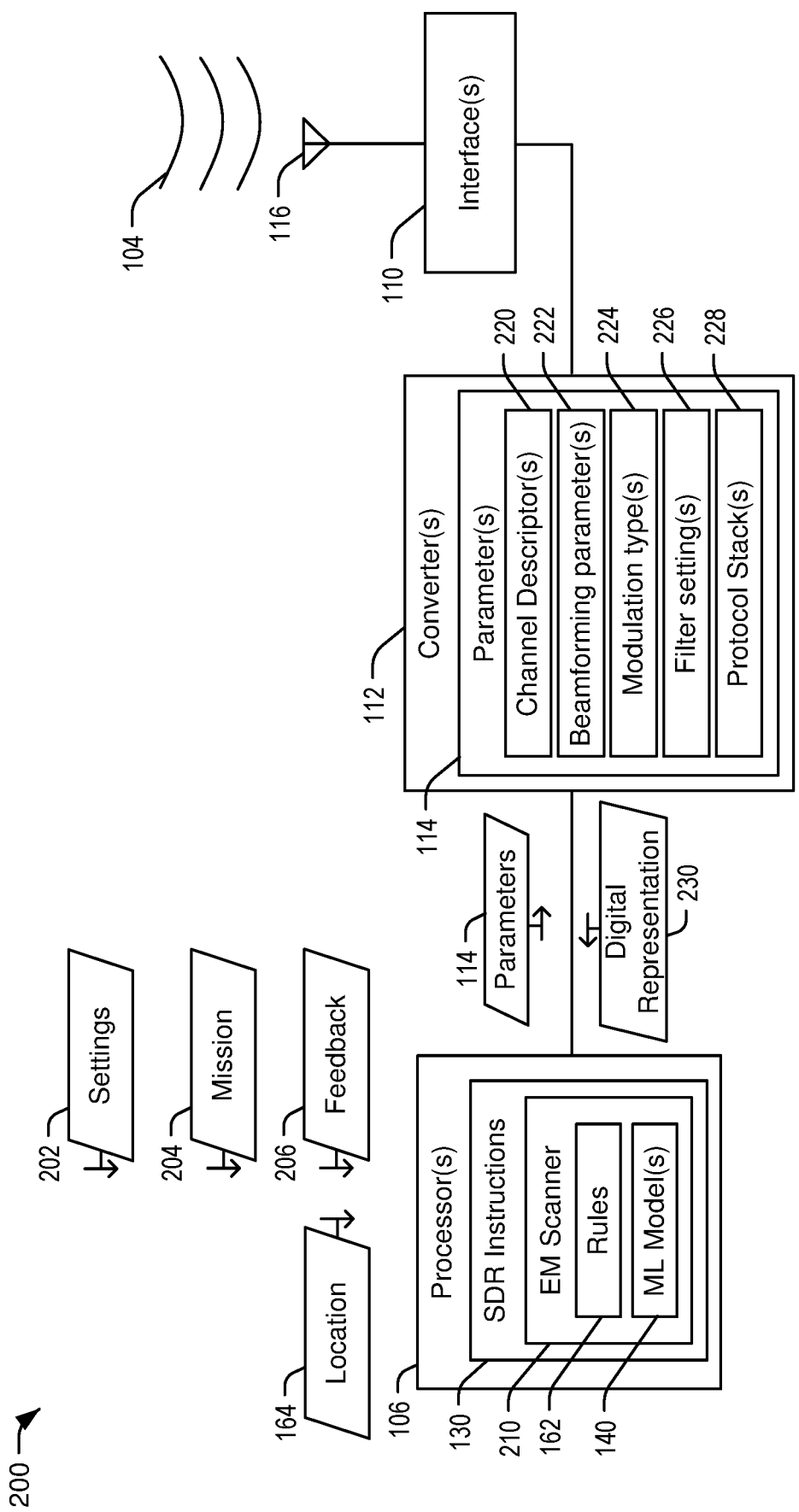
FIG. 2 is a block diagram illustrating particular aspects of execution of software-defined radio instructions by the device of FIG. 1.

FIG. 2 includes a diagram 200 that illustrates aspects of execution of the SDR instructions 130 in a particular implementation. In FIG. 2, the processor(s) 106 obtain various input data that are used to determine how the SDR instructions 130 perform various operations. In the implementation illustrated in FIG. 2, the input data include settings data 202, mission data 204, feedback data 206, and location data 164. In other implementations, the input data for the SDR instructions 130 include more, fewer, or different data. The settings data 202 include user-defined values indicating preferences for operation of the SDR instructions 130. For example, the settings data 202 may indicate a range of frequencies of interest, confidence thresholds, or other values that correspond to operational limitations of the SDR instructions 130. The mission data 204 include values indicating a particular goal or activity to be performed by the device 102 as a whole, such as intelligence gathering, electronic countermeasures, etc. The mission data 204 correspond to or map to a set of settings specific to operation of the SDR instructions 130, similar to the settings data 202, and may override or may be overridden by values in the settings data 202. The feedback data 206 include values or control signals provided to the SDR instructions 130 by other components or software of the device 102. For example, various operations performed by the device 102 itself may result in emission of electromagnetic waveforms. In this example, the feedback data 206 may indicate when such operations are being performed to enable the SDR instructions 130 to account for (e.g., filter out) these self-generated electromagnetic waveforms. The location data 164 indicate a location of the device 102, which may be mapped to different settings data 202 or mission data 204. To illustrate, the mission data 204 may indicate that the device 102 is to perform passive data gathering in a first geographic region and is to perform active electronic warfare in another geographic region, and the location data 164 may be used to determine when to switch between these two modes of operation.

In FIG. 2, the SDR instructions 130 include an electromagnetic (EM) scanner 210 that selects the parameters 114 to control the converter(s) 112 using one or more rules 162, using one or more machine-learning model(s) 140, or both. In the implementation illustrated in FIG. 2, the parameters 114 include channel descriptor(s) 220, beamforming parameter(s) 222, modulation type(s) 224, filter setting(s) 226, and protocol stack(s) 228. In other examples, the parameters 114 include more, fewer, or different values to control operation of the converter(s) 112. The channel descriptor(s) 220 specify one or more ranges of frequencies that are to be monitored. The beamforming parameter(s) 222 are used to control beam characteristics and pointing direction of one or more phased array antenna(s). The modulation type(s) 224 indicate types of modulation to be monitored for in the electromagnetic waveform 104. The filter setting(s) 226 indicate characteristics of electromagnetic waveforms (or corresponding electrical signals) that are to be blocked or passed. The protocol stack(s) 228 indicate operations to be used to attempt to decode signals from an observed electromagnetic waveform 104. Although FIGS. 1 and 2 show the parameters 114 stored in the converter(s) 112, in some implementations, the converter(s) 112 or the interface(s) 110 are controlled via control signals from the processor(s) 106 responsive to the SDR instructions 130.

In some implementations, the processor(s) 106 executing the SDR instructions 130 use one or more machine-learning model(s) 140 to set the parameters 114. For example, the EM scanner 210 can use a decision model that is trained to select the parameters 114 to scan an electromagnetic spectrum for electromagnetic waveforms of interest. In this example, the decision model can set the parameters 114 based on the location data 164 of the device 102, based on mission settings indicated by the mission data 204, based on feedback data 206, such as the sensor data 152 or information received from one or more other devices (such as peer devices or controllers), etc.

Returning to FIG. 1, the instructions 122 include one or more machine-learning models 140 ("ML models" in FIG. 1). The machine-learning model(s) 140 include models that are used by the SDR instructions 130, the response instructions 132, or both, to perform various functions. For example, as explained above with reference to FIG. 2, the SDR instructions 130 may use one or more of the machine-learning model(s) 140 to select the parameters 114. The machine-learning model(s) 140 may include one or more decision models 142, one or more embedding networks 144, one or more classification models 146, and one or more regression models 148. In other implementations, the memory device(s) 108 include more, fewer, or different machine-learning models 140. The machine-learning models 140 may include one or more perceptrons, one or more neural networks, one or more support vector machines, one or more decision trees, one or more prototypical networks, one or more variants of these, or combinations thereof. An example of a process that can be used to generate one or more of the machine-learning model(s) 140 is described with reference to FIG. 14.

The decision model(s) 142 include machine-learning models that are trained to select an action to be performed based on input data. For example, a decision model 142 can be trained using a reinforcement learning methodology to select an action to be performed given input data descriptive of a current state. To illustrate, the response instructions 132 can use one or more of the decision model(s) 142 to select a response action to be performed based on a received electromagnetic waveform 104 and possibly other information. As another example, the SDR instructions 130 can use one or more of the decision model(s) 142 to select the parameter(s) 114 provided to the converter(s) 112 to scan an electromagnetic environment for the electromagnetic waveform 104 based on various input data, such as the location data 164, the feedback data 206, which may indicate or include, for example, predictions about a position, movement, or action of another device (e.g., the future position 168, the movement direction 170, and the future action 166, respectively), sensor data 152, or data descriptive of electromagnetic waveforms previously received by the device 102 or other devices (e.g., waveform data 150, decoded symbol(s) 154, or feature data 156).

The embedding network(s) 144 include machine-learning models that are trained to generate an embedding vector or feature data (such as the feature data 156) based on input data. For example, an embedding network 144 can be generated by training an autoencoder to encode input data into a latent space representation and to reconstruct the input data from the latent space representation. In this example, an encoder side of the autoencoder can be used as an embedding network. In a particular implementation, the response instructions 132 use the embedding network(s) 144 to generate the waveform data 150 based on input data including a digital representation 230, which is further described herein. In some implementations, the response instructions 132 use the embedding network(s) 144 to generate the feature data 156 based on the waveform data 150 and other data, such as the sensor data 152, the decoded symbol(s) 154, or both.

In a particular implementation, the classification model(s) 146 include machine-learning model(s) that are trained to generate a classification result (e.g., to select a value of a discrete-valued variable) based on input data. Similarly, the regression model(s) 148 include machine-learning model(s) that are trained to generate a regression value (e.g., to generate a value of a continuously-valued variable) based on input data. In some implementations, the response instructions 132 use the classification model(s) 146 to generate data indicating a device type 158 of a device that generated the electromagnetic waveform 104.

As a non-limiting example, the classification model(s) 146 may be trained to distinguish military devices types from commercial/civilian device types. To illustrate, military device types include military vehicles (e.g., aircraft, watercraft, spacecraft, or land craft), military personal radio equipment (e.g., beacons, handheld radios, satellite phones), some types of radar transmitters (e.g., targeting radar), among other examples. In contrast, civilian/commercial device types include, for example, Internet of Things (IoT) devices (such as appliances, smart home controllers, thermostats, etc.), personal computing or communication devices (e.g., mobile phones, laptop computers, wireless access points, etc.), police or other civilian radio communications, commercial/civilian aircraft (e.g., airborne dependent surveillance—broadcast communications), and infrastructure devices that support such systems (e.g., cellular network base stations), other wireless transmitters (e.g., garage door openers), among other examples. In the examples above, distinguishing characteristics of military device types may include, for example, high power signals, pulsed signals, signals that use particular encoding schemes (such low-probability of detection radar encoding), strongly encrypted signals, signal sources in particular areas (e.g., military bases), transmitters that move in a particular manner (e.g., high-speed, low altitude aircraft). In contrast, distinguishing characteristics of commercial/civilian device types may include lower power signal, common or standard communication encoding schemes (e.g., transmissions that conform to an industry standard), lower end encryption, etc. The distinguishing characteristics listed above are merely examples. Since the classification model(s) 146 are trained machine-learning models, details of which characteristics are distinguishing may differ significantly from device type to deice type and from model to model.

Further, in some implementations, the classification model(s) 146 are trained to identify specific devices types rather than broad categories. To illustrate, given sufficient training data, the classification model(s) 146 may be trained to distinguish the radar system used by a particular generation or model of targeting radar system from another targeting radar system. Likewise, the classification model(s) 146 may be trained to distinguish a particular model of garage door opener or smart thermostat from another model of garage door opener or thermostat.

In some implementations, the response instructions 132 can use the classification model(s) 146 or the regression model(s) 148 to generate an output indicating whether a signal is detected in the electromagnetic waveform 104. For example, a classification model 146 can be used to generate a simple binary signal detection indicator, which may or may not be accompanied by a confidence value. In another example, a regression model 148 can be used to generate a value indicating a probability that the electromagnetic waveform 104 encodes a signal.

Returning to FIG. 2, in some implementations, the SDR instructions 130 set the parameters 114 based on rules 162 (rather than, or in addition to, the machine-learning model(s) 140) that are integrated within the SDR instructions 130 or stored with the data 124. In some implementations, the SDR instructions 130 set the parameters 114 based on the rules 162 in some time periods and set the parameters 114 using the machine-learning model(s) 140 in other time periods. To illustrate, the SDR instructions 130 can be configured to scan the electromagnetic spectrum (by continuously, periodically, or occasionally setting the parameters 114 to new values) according to the rules 162 until a particular condition is satisfied (e.g., until a sensor 120 detects an object or until a command is received from another device). When the particular condition is satisfied, the SDR instructions 130 switch to setting the parameters 114 based on the machine-learning model(s) 140.

In a particular implementation, the converter(s) 112 generate the digital representation 230 (such as a bitstream) representing at least a portion of the electromagnetic waveform 104 and provide the digital representation 230 to the processor(s) 106. In some implementations, the converter(s) 112 use one or more of the protocol stack(s) 228 to convert symbols decoded from the electromagnetic waveform 104 into packets that are provided to the processor(s) 106 via the digital representation 230.

The digital representation 230 is indicative of characteristics of the electromagnetic waveform 104. For example, the digital representation 230 can indicate physical layer attributes of a signal encoded by the electromagnetic waveform 104. In this example, physical layer attributes include one or more of amplitude, peak amplitude, amplitude distribution, signal amplitude in comparison to background noise amplitude, or other amplitude statistics), frequency characteristics (e.g., center frequency, frequency distribution, or other frequency statistics), or modulation characteristics (e.g., type of modulation, symbol rate, or other modulation statistics). In some implementations, the digital representation 230 directly encodes the physical layer attributes. For example, when frame boundaries are detected in the signal, and the signal can be packetized, the digital representation 230 can include information extracted from packet headers, such as symbol rate. In some implementations, one or more of the physical layer attributes are inferred based on the parameters 114 used to generate the digital representation 230. To illustrate, the center frequency of a signal can be estimated based on a bandpass filter setting parameter used by the converters 112 to generate the digital representation 230.

Figure 3:
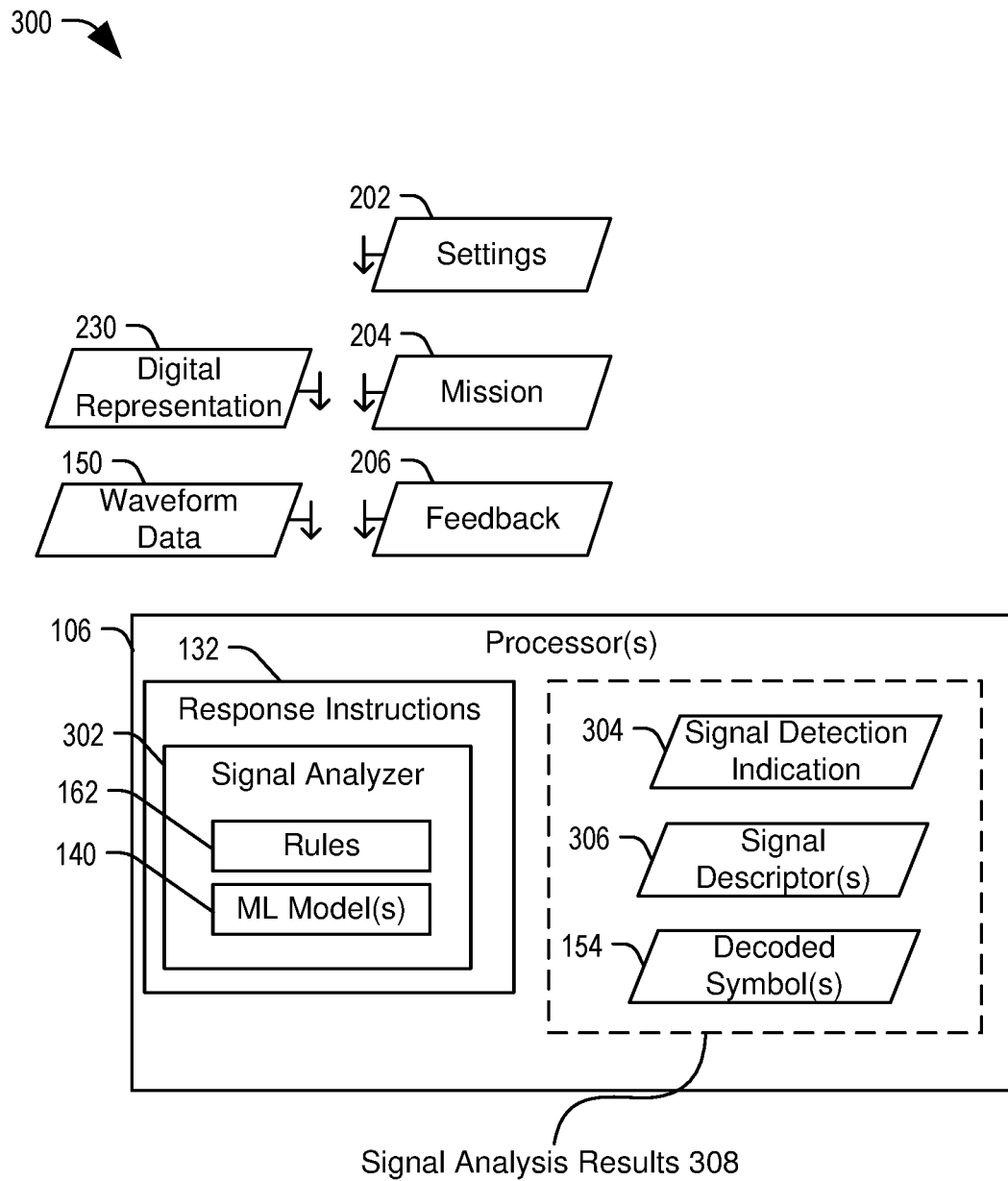
FIG. 3 is a block diagram illustrating particular aspects of execution of a signal analyzer of the device of FIG. 1.

After the electromagnetic waveform 104 is received and the converter(s) 112 generate the digital representation 230 of at least a portion of the electromagnetic waveform 104, the response instructions 132 generate the waveform data 150 descriptive of at least the portion of the electromagnetic waveform 104, signal analysis results as described further in FIG. 3, or both. A particular implementation of signal analysis aspects of execution of the response instructions 132 is described further with reference to FIG. 3, and a particular implementation of waveform analysis aspects of execution of the response instructions 132 is described further with reference to FIG. 4.

In FIG. 3, a diagram 300 illustrates that the processor(s) 106 obtain various input data that are used by a signal analyzer 302 to perform various operations. In the implementation illustrated in FIG. 3, the input data include the settings data 202, the mission data 204, the feedback data 206, the digital representation 230, and the waveform data 150. In other implementations, the input data for the signal analyzer 302 include more, fewer, or different data. The settings data 202 for the signal analyzer 302 include user-defined values indicating preferences for operation of the signal analyzer 302. For example, the settings data 202 may indicate a whitelist of signals (e.g., types of signals to be looked for), a blacklist of signals (e.g., types of signals to be ignored), or other values that correspond to operational characteristics of the signal analyzer 302. The mission data 204 include values indicating a particular goal or activity to be performed by the device 102 as a whole, such as intelligence gathering, electronic countermeasures, etc. The mission data 204 correspond to or map to a set of settings specific to operation of the signal analyzer 302, similar to the settings data 202, and may override or may be overridden by value in the settings data 202. The feedback data 206 include values or control signals provided to the signal analyzer 302 by other components or software of the device 102. For example, the device 102 may receive transmissions from peer devices, and the feedback data 206 may indicate when such signals are received to enable the signal analyzer 302 to account for (e.g., filter out) these signals. The waveform data 150 is data generated by the waveform analyzer 402 of FIG. 4 and is descriptive of characteristics of the electromagnetic waveform 104.

The signal analyzer 302 includes instructions (and may also include special-purpose hardware) that use one or more of the rules 162, one or more of the machine-learning model(s) 140, or both to determine signal analysis results 308 based on the input data. In the implementation illustrated in FIG. 3, the signal analysis results 308 include a signal detection indication 304, signal descriptors 306, and one or more decoded symbols 154. In other implementations, the signal analysis results 308 include more, less, or different data. For example, in some implementations, the signal analysis results 308 include only the signal detection indication 304. In other implementations, the signal analysis results 308 include only the signal descriptor(s) 306, only the decoded symbol(s) 154, or the signal descriptor(s) 306 and the decoded symbol(s) 154, (and no explicit signal detection indication 304). To illustrate, in some implementations, the signal descriptor(s) 306, the decoded symbol(s) 154, or both, are included in the signal analysis results 308 when a signal is detected. In such implementations, the signal detection indication 304 is implicit when the signal descriptor(s) 306, the decoded symbol(s) 154, or both, are present in the signal analysis results 308.

In a particular implementation, the signal detection indication 304 is a logical value (e.g. a single bit) that indicates whether the signal analyzer 302 detects a signal based on the input data. In another particular implementation, the signal detection indication 304 is a value that indicates a likelihood that a signal is present in a portion of the electromagnetic waveform 104 based on the input data. To illustrate, the signal analyzer 302 may provide the input data, or a portion thereof, to a regression model 148 of the machine-learning model(s) 140 to generate an estimate of the likelihood that a signal is present.

The signal descriptor(s) 306 include descriptive information related to a detected signal, such as an encoding or modulation scheme used to send the signal, whether the signal or a portion of the signal is encrypted, a communication protocol used by the signal, etc. The decoded symbol(s) 154 include one or more symbols that are extracted from the signal and decoded (e.g., represented as bits or other values).

In some implementations, the signal analyzer 302 uses the rules 162 to map particular signal characteristics into values of the signal descriptor(s) 306. For example, a frequency modulated signal in a licensed frequency band may be assigned a first value and a frequency modulated signal in an unlicensed band may be assigned a different value based on the rules 162. In other implementations, the signal analyzer 302 uses the machine-learning model(s) 140 to determine values of the signal descriptor(s) 306 based on the input data. For example, the input data can be provided to a trained machine-learning model, such as a decision tree, to determine a value of a data field of the signal descriptor(s) 306. In still other implementations, the signal analyzer 302 uses both the rules 162 and the machine-learning model(s) 140 to generate the signal descriptor(s) 306. For example, a trained machine-learning model may be used to determine which rule or rules 162 are to be used to generate a data field of the signal descriptor(s) 306. To illustrate, the input data (or a portion thereof) can be provided to a set of trained autoencoders, where each autoencoder of the set is trained to encode and reconstruct signals of a particular type. In this illustrative example, the signal is assumed to be of a signal type that is associated with the autoencoder that is able to reconstruct the signal with the least reconstruction loss, and the input data is analyzed based on a set of rules 162 associated with that signal type. In another example, one or more of the rules 162 are used to select a trained machine-learning model to generate a data field of the signal descriptor(s) 306. Similarly, in some implementations, the signal analyzer 302 uses the rules 162 to decode one or more symbols from the signal to generate the decoded symbol(s) 154; in other implementations, the signal analyzer 302 uses the machine-learning model(s) 140 to decode the one or more symbols from the signal to generate the decoded symbol(s) 154; and in still other implementations, the signal analyzer 302 uses both the rules 162 and the machine-learning model(s) 140 to decode the one or more symbols from the signal to generate the decoded symbol(s) 154.

The decoded symbol(s) 154 depend on the nature and content of the signal. For example, many communications signals, such as communication signals transmitted in accordance with one of the Institute of Electrical and Electronics Engineers (IEEE) wireless 802 family of standards include data packets with header portions and payload portions. In many such signals, the header portion includes unencrypted data that indicates an address of a sending device, an address of a target device, information about the payload (e.g., payload size), information about the transmission protocol, timing information, etc. Additionally, some signals include unencrypted data in at least some of the payload portion. The signal analyzer 302 is configured to decode one or more symbols representing such data to generate the decoded symbol(s) 154.

Figure 4:
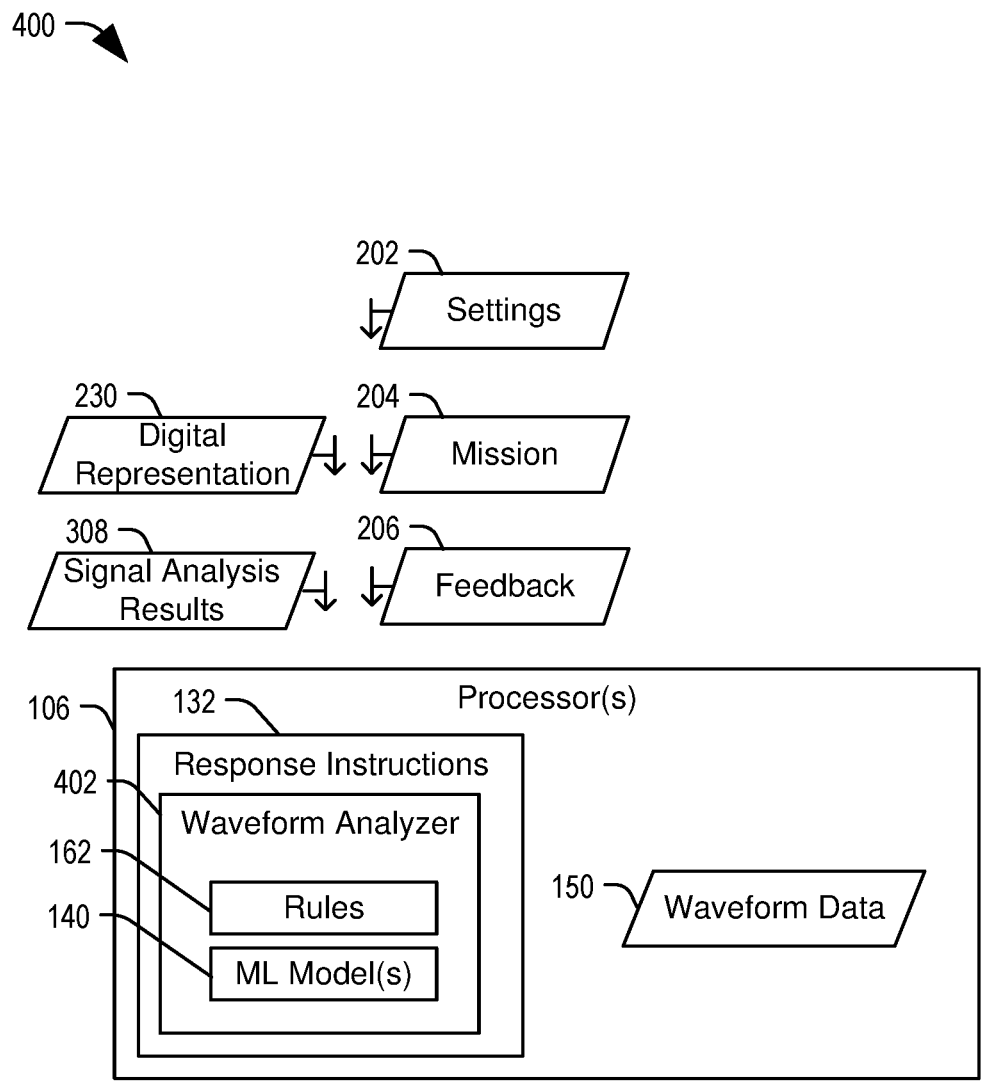
FIG. 4 is a block diagram illustrating particular aspects of execution of a waveform analyzer of the device of FIG. 1.

In FIG. 4, a diagram 400 illustrates that the processor(s) 106 obtain various input data that are used to determine how a waveform analyzer 402 performs various operations. In the implementation illustrated in FIG. 4, the input data include the settings data 202, the mission data 204, the feedback data 206, the digital representation 230, and the signal analysis results 308. In other implementations, the input data for the waveform analyzer 402 include more, fewer, or different data. The settings data 202 for the waveform analyzer 402 include user-defined values indicating preferences for operation of the waveform analyzer 402. For example, the settings data 202 may indicate a level of detail of the waveform data 150 generated by the waveform analyzer 402, where higher levels of detail (in contrast with lower levels of detail) use more processing and memory resources but preserve information about the electromagnetic waveform with greater fidelity. The mission data 204 include values indicating a particular goal or activity to be performed by the device 102 as a whole. The mission data 204 correspond to or map to a set of settings specific to operation of the waveform analyzer 402, similar to the settings data 202, and may override or may be overridden by value in the settings data 202. The feedback data 206 include values or control signals provided to the waveform analyzer 402 by other components or software of the device 102. For example, the device 102 may generate electromagnetic waveforms (e.g., noise) during operation or receive transmissions from peer devices, and the feedback data 206 may indicate portions of the electromagnetic waveform that can be attributed to such sources and ignored during generation of the waveform data 150.

In the implementation illustrated in FIG. 4, the waveform analyzer 402 uses the signal analysis results 308 as part of the input data to generate the waveform data 150. In other implementations, as illustrated in FIG. 3, the signal analyzer 302 uses the waveform data 150 as part of the input data to generate the signal analysis results 308. In some implementations, the waveform analyzer 402 and the signal analyzer 302 operate cooperatively or iteratively to determine the waveform data 150 and the signal analysis results 308. For example, in a first iteration, the signal analyzer 302 may provide the signal analysis results 308 (or a portion thereof, such as the signal detection indication 304) to the waveform analyzer 402. In this example, the waveform analyzer 402 uses the signal analysis results 308, along with portions of the input data, to generate a first estimate of the waveform data 150, which provided to the signal analyzer 302. The signal analyzer 302 and the waveform analyzer 402 may continue through one or more additional iteration to converge on final values of the signal analysis results 308 and the waveform data 150.

In some implementations, the waveform data 150 is generated by comparing the digital representation 230 to mapping data of the rules 162, where the mapping data maps characteristics of the electromagnetic waveform 104 to fields or values of the waveform data 150. In some implementation, the response instructions 132 use both the rules 162 and a machine-learning model 140 to generate the waveform data 150. To illustrate, the waveform data 150 for a particular portion of the electromagnetic waveform 104 can include data generated based on the rules 162 and data generated based on the machine-learning model(s) 140. For example, the waveform data 150 for the particular portion of the electromagnetic waveform 104 include a vector of values, including first values based on the rules 162 concatenated with, or mathematically or logically combined with, second values based on the machine-learning model(s) 140. In another illustrative example, a particular machine-learning model 140 used to generate the waveform data 150 is selected based on the rules 162.

In some implementations, the sensor(s) 120 of FIG. 1 generate the sensor data 152 based on results output by the signal analyzer 302, on results output by the waveform analyzer 402, or both. For example, the device 102 may activate the sensor(s) 120 or may sample output of the sensor(s) 120 to generate the sensor data 152 based on a characteristic of the electromagnetic waveform 104 indicated by the waveform data 150. As another example, the device 102 may activate the sensor(s) 120 or may sample output of the sensor(s) 120 to generate the sensor data 152 based on whether the signal analyzer 302 detects a signal in the electromagnetic waveform 104 (as indicated by the signal detection indication 304), based on characteristics of a detected signal (as indicated by the signal descriptors 306), based on one or more decoded symbol(s) 154, or a combination thereof.

The signal analysis results 308 (or a portion thereof), the waveform data 150 (or a portion thereof), or both, are used to generate the feature data 156. For example, FIG. 5 illustrates various aspects of execution of a feature data encoder 502 of the response instructions 132.

Figure 5:
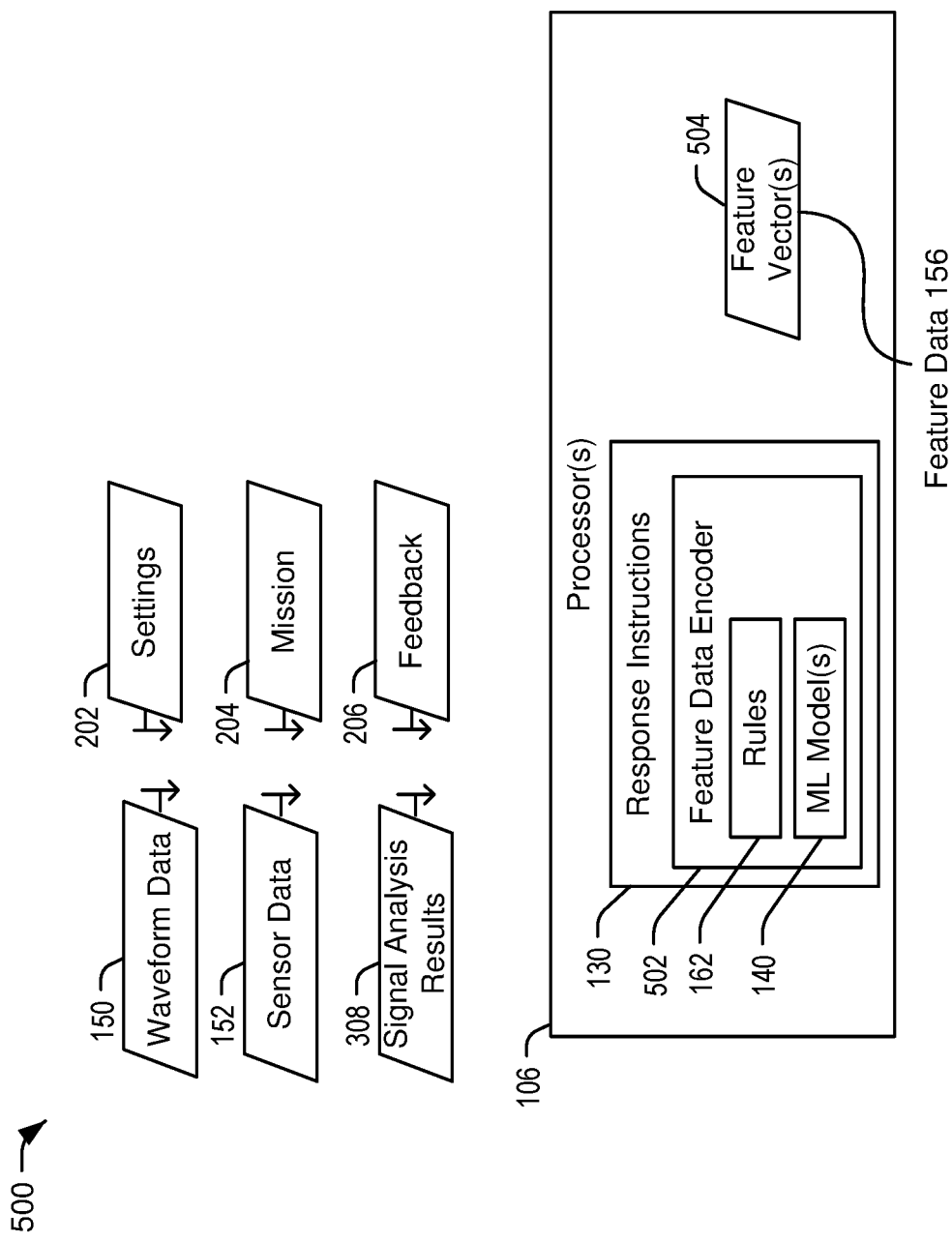
FIG. 5 is a block diagram illustrating particular aspects of execution of a feature data encoder of the device of FIG. 1.

In the example of FIG. 5, a diagram 500 illustrates that the processor(s) 106 obtain various input data that are used to determine how the feature data encoder 502 performs various operations. In the implementation illustrated in FIG. 5, the input data include the settings data 202, the mission data 204, the feedback data 206, the waveform data 150, the sensor data 152, and the signal analysis results 308. In other implementations, the input data for the feature data encoder 502 include more, fewer, or different data. The input data in FIG. 5 can be divided into control data and encoding data. The control data includes data that controls how or when the feature data encoder 502 operates, such as the settings data 202, the mission data 204, the feedback data 206. The encoding data includes data that is operated on by the feature data encoder 502 to generate the feature data 156. The encoding data includes at least the waveform data 150. In some implementations, the encoding data also includes the sensor data 152, the signal analysis results 308, or both. In some implementations, portions of the signal analysis results 308 are encoding data and other portions of the signal analysis results 308 are control data. To illustrate, the signal descriptor(s) 306, the signal detection indication 304, or both, may be used as control data to control how the feature data encoder 502 operates, and the decoded symbol(s) 154 may be used as encoding data during generation of the feature data 156.

The settings data 202 for the feature data encoder 502 include user-defined values indicating preferences for operation of the feature data encoder 502. For example, the settings data 202 may indicate whether or when the sensor data 152 is to be used to generate the feature data 156. The mission data 204 include values indicating a particular goal or activity to be performed by the device 102 as a whole. The mission data 204 correspond to or map to a set of settings specific to operation of the feature data encoder 502, similar to the settings data 202, and may override or may be overridden by value in the settings data 202. The feedback data 206 include values or control signals provided to the feature data encoder 502 by other components or software of the device 102. For example, the sensor(s) 120 of the device 102 may provide a feedback signal to the feature data encoder 502 indicating whether the sensor data 152 is available.

In some implementations, the feature data 156 is generated based on the rules 162, by providing the waveform data 150 as input to one or more of the machine-learning model(s) 140, such as to an embedding network 144, or a combination thereof. To illustrate, the rules 162 may be used to determine, under particular circumstances, which other data is provided to the embedding network 144 along with the waveform data 150 to generate the feature data 156. In a particular example, the waveform data 150 and the sensor data 152 are provided to the embedding network 144 to generate the feature data 156. In another particular example, the waveform data 150 and the decoded symbol(s) 154 are provided to the embedding network 144 to generate the feature data 156. In the example illustrated in FIG. 5, the feature data 156 includes one or more feature vectors 504. When the feature data 156 includes two or more feature vectors 504, the feature vectors 504 may be concatenated, or may be mathematically or logically combined for subsequent analysis.

In a particular implementation, the feature data 156 can be used to determine the device type 158 of a device that generated the electromagnetic waveform 104 or a portion thereof. For example, FIG. 6 illustrates various aspects of execution of a device classifier 602 of the response instructions 132.

Figure 6:
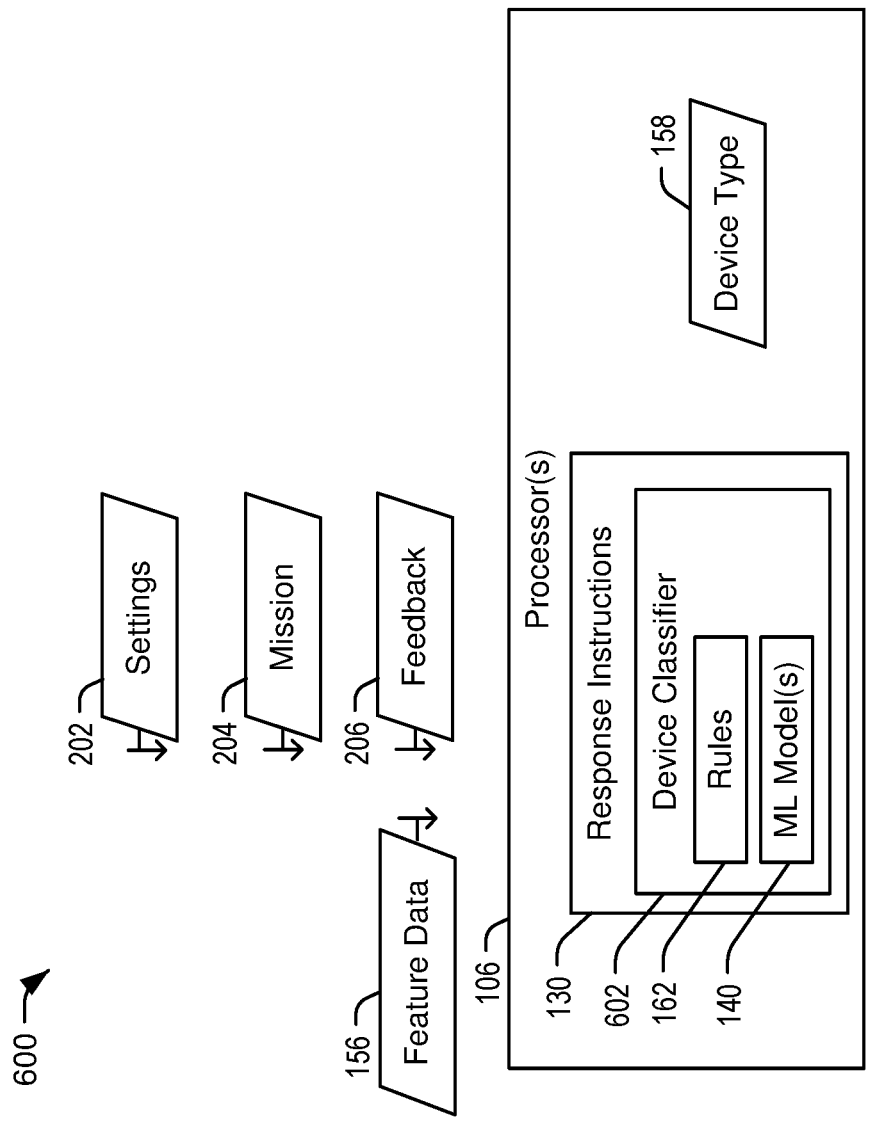
FIG. 6 is a block diagram illustrating particular aspects of execution of a device classifier of the device of FIG. 1.

In the example of FIG. 6, a diagram 600 illustrates that the processor(s) 106 obtain various input data that are used to determine how the device classifier 602 performs various operations. In the implementation illustrated in FIG. 6, the input data include the settings data 202, the mission data 204, the feedback data 206, and the feature data 156. In other implementations, the input data for the device classifier 602 include more, fewer, or different data. The input data in FIG. 6 can be divided into control data and classification input data. The control data includes data that controls how or when the device classifier 602 operates, such as the settings data 202, the mission data 204, and the feedback data 206. The classification input data includes data that is operated on by the device classifier 602 to generate the device type 158. The classification input data includes one or more feature vectors 504 of the feature data 156.

The settings data 202 for the device classifier 602 include user-defined values indicating preferences for operation of the device classifier 602. For example, the settings data 202 may indicate particular rules 162 or machine-learning model(s) 140 that are to be used or particular device types that should be included in or omitted from consideration.

The mission data 204 include values indicating a particular goal or activity to be performed by the device 102 as a whole. The mission data 204 correspond to or map to a set of settings specific to operation of the device classifier 602, similar to the settings data 202, and may override or may be overridden by value in the settings data 202. The feedback data 206 include values or control signals provided to the device classifier 602 by other components or software of the device 102. For example, the sensor(s) 120 of the device 102 may provide a feedback signal to the device classifier 602 indicating whether the feature data 156 includes or is based on the sensor data 152.

In a particular implementation, the device classifier 602 provides the feature data 156 as input to one or more of the machine-learning model(s) 140. In some implementations, the device classifier 602 has access to multiple machine-learning model(s) 140 and uses the rules 162 to select a particular set of one or more machine-learning model(s) 140 to use to determine the device type 158.

In some implementations, the response instructions 132 use various data to generate predictions about the intentions of the device that generated the electromagnetic waveform (or a portion thereof). For example, FIG. 7 is a diagram 700 that illustrates various aspects of execution of a prediction engine 702 of the response instructions 132.

Figure 7:
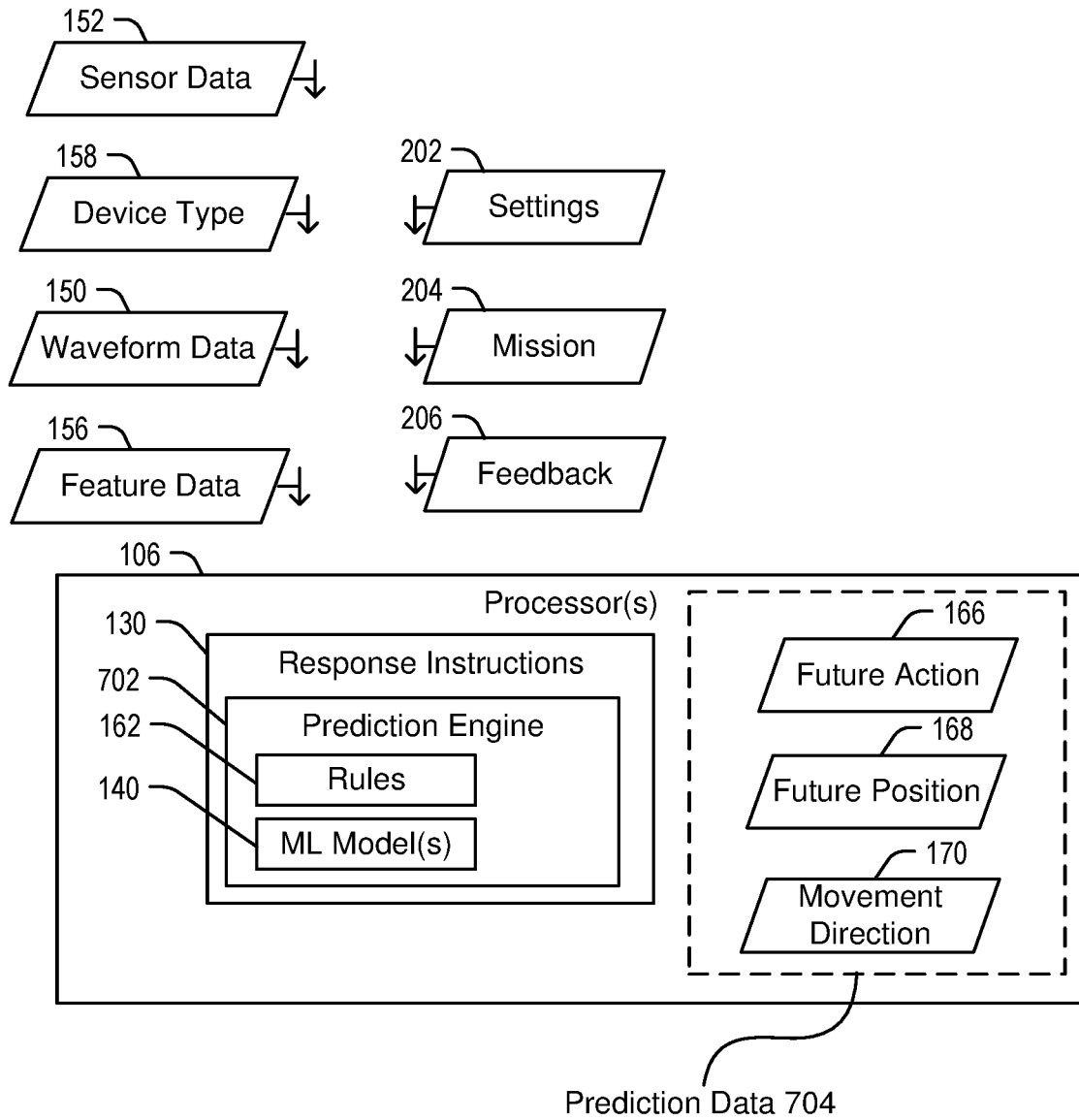
FIG. 7 is a block diagram illustrating particular aspects of execution of a prediction engine of the device of FIG. 1.

In the example of FIG. 7, the processor(s) 106 obtain various input data that are used by the prediction engine 702. In the implementation illustrated in FIG. 7, the input data include the settings data 202, the mission data 204, the feedback data 206, the feature data 156, the waveform data 150, the device type 158, and the sensor data 152. In other implementations, the input data for the prediction engine 702 include more, fewer, or different data. The input data in FIG. 7 can be divided into control data and prediction input data. The control data includes data that controls how or when the prediction engine 702 operates, such as the settings data 202, the mission data 204, and the feedback data 206. The prediction input data includes data that is operated on by the prediction engine 702 to generate prediction data 704.

The prediction input data includes one or more feature vectors 504 of the feature data 156, the waveform data 150, the device type 158, the sensor data 152, or a combination thereof. The particular set of prediction input data used to generate the prediction data 704 depends on which data are available. For example, in some circumstances, certain sensor data 152 may be unavailable due to equipment load out of the device 102, equipment failures, or external factors, such as weather. The particular set of prediction input data used to generate the prediction data 704 may also, or alternatively, depend on the type of prediction to be made. For example, in FIG. 7, the prediction engine 702 is configured to generate predictions indicating a future action 166, a future position 168, a movement direction 170, or a combination thereof. Certain of these types of predictions (or others) may be possible only with particular prediction input data are available. To illustrate, it may be possible to estimate the future position 168 of a device without knowing the nature (e.g., device type 158) of the device. For example, a series of past positions, indicated by the sensor data 152, can be used to extrapolate the future position 168 irrespective of the device type 158. However, it may be difficult to predict a future action 166 of the device without some indication of the capabilities or options available to the device, which is in part based on the device type 158.

The prediction engine 702 uses one or more of the rules 162, one or more of the machine-learning models 140, or both, to generate the prediction data 704. For example, the rule 162 can include algorithms to calculate certain prediction data values. To illustrate, the rules 162 may include algorithms to generate the future position 168 of the device based on linear extrapolation or Newton's laws of motion. As another example, one or more of the machine-learning model(s) 140 can be trained (e.g., based on historical records of similar encounters or based on simulation data) to predict the future action 166 or movement direction 170 of the device. In some implementations, the machine-learning model(s) 140 generate a confidence value associated with each of a set of one or more prediction data values, and the response instructions 132 use the confidence values as well as the prediction data 704 to select a response action.

In some implementations, the response instructions 132 use various data to select a response action based on a detected electromagnetic waveform 104. For example, FIG. 8 illustrates various aspects of execution of a response action selector 802 of the response instructions 132.

Figure 8:
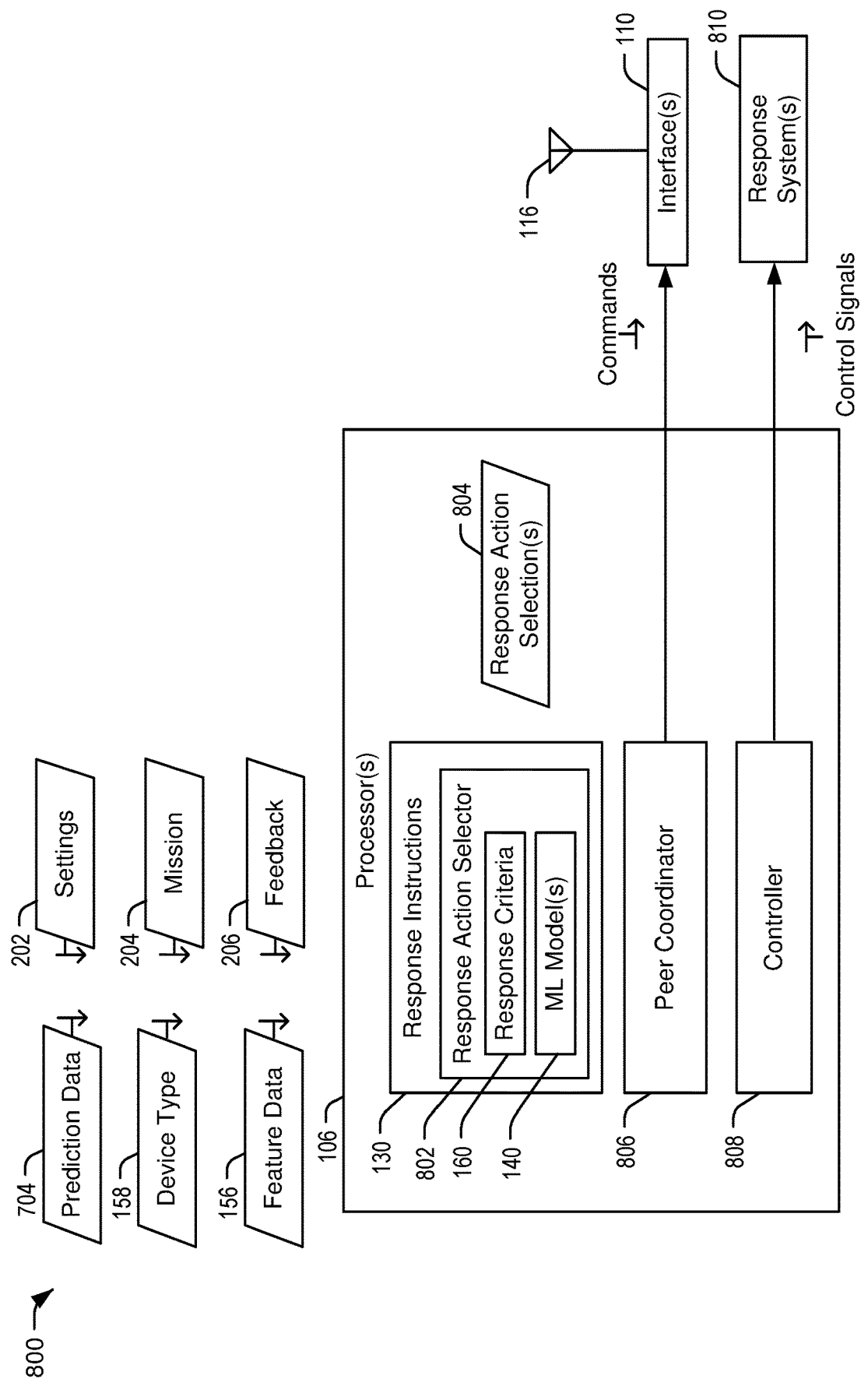
FIG. 8 is a block diagram illustrating particular aspects of execution of a response action selector of the device of FIG. 1.

In the example of FIG. 8, a diagram 800 illustrates that the processor(s) 106 obtain various input data that are used to the response action selector 802. In the implementation illustrated in FIG. 8, the input data include the settings data 202, the mission data 204, the feedback data 206, the feature data 156, the device type 158, and the prediction data 704. In other implementations, the input data for the response action selector 802 include more, fewer, or different data. The input data in FIG. 8 can be divided into control data and response selection input data. The control data includes data that controls how or when the response action selector 802 operates, such as the settings data 202, the mission data 204, the feedback data 206. The response action input data includes data that is operated on by the response action selector 802 to generate one or more response action selections 804. In some implementations, certain of the input data is both control data and response selection input data. For example, the response action selector 802 may compare the device type 158 to the response criteria 160 to generate a response action selection 804, to determine whether to process other data (such as the feature data 156), or both.

In some implementations, the response action selector 802 compares the feature data 156, the device type 158, the prediction data 704, other data (e.g., the sensor data 152 or the waveform data 150), or a combination thereof, to the response criteria 160. In such implementations, when a particular response criterion is satisfied, a corresponding response action is indicated in the response action selection(s) 804. For example, in response to a first response criterion being satisfied, the device 102 may initiate transmission of a jamming signal; in response to a second response criterion being satisfied, the device 102 may save the location data indicating a location associated with reception of the electromagnetic waveform 104; in response to a third response criterion being satisfied, the device 102 may initiate transmission of waveform descriptive data to another device (e.g., a peer device or a control device); and in response to a fourth response criterion being satisfied, the device 102 may initiate transmission of a spoofing signal. When the device 102 includes a beamformer or another directional receiver, the location data 164 may include information indicating a direction toward a source of the electromagnetic waveform 104. As another example of a response action, a beamformer or other directional transmitter may be used to transmit or retransmit certain data or a particular signal. The particular response actions listed above are illustrative and not limiting. In other implementations, the device 102 is configured to initiate more response actions, fewer response actions, or different response actions than those listed above.

In some implementation, the response action selector 802 determines one or more of the response action selection(s) 804 using one or more of the machine-learning model(s) 140. For example, the machine-learning model(s) 140 can include one or more models that are trained (e.g., based on similar historical or simulated encounters) to determine the response action selection(s) 804 from among a set of potential response action.

FIG. 8 also shows that the processor(s) 106 can initiate or control performance of the response action indicated by the response action selection(s) 804. For example, the device 102 can include a peer coordinator 806 that is configured to send commands or data to other devices (e.g., peers of the device 102) to coordinate a response to a detected electromagnetic waveform 104. Examples of such coordinate responses include swarm responses in which multiple peer devices take action against a device that generated the electromagnetic waveform 104, move toward the device that generated the electromagnetic waveform 104, or move toward a predicted future position of the device that generated the electromagnetic waveform 104.

As another example, the device 102 may include a controller 808 that is configured to control operation of the device 102, such as by sending control signals to response systems 810 of the device 102. In this example, the response systems 810 include propulsion systems, weapons systems, electronic warfare systems, the sensors 120, other systems, or combinations thereof.

Thus, the device 102 of FIGS. 1-8 combines aspects of software-defined radio and machine-learning to automate response to a variety of different situations involving electromagnetic waveforms. For example, the SDR instructions 130 enable the device 102 to detect and evaluate electromagnetic waveforms over a wide range of frequencies and with various modulation characteristics. The SDR instructions 130 can continuously, periodically, or occasionally change the parameters 114 to change operating characteristics of the interface(s) 110, the converter(s) 112, or both, to sample different portions of an electromagnetic spectrum or to perform different analysis on a particular portion of the electromagnetic spectrum. To illustrate, the SDR instructions 130 can sweep a range of unlicensed frequency bands to identify a particular frequency or frequencies in which a device (e.g., a transmitting device) is operating, then perform more detailed analysis of the particular frequency or frequencies to attempt to identify a device type 158 of the device and initiate a response action if appropriate. In some examples, different SDR systems that are onboard different devices (e.g., unmanned devices) may monitor different parts of the electromagnetic spectrum and/or differently beamformed or otherwise directed signals. Alternatively, or in addition, different devices in a swarm of unmanned devices may take the same or different response actions. Thus, the device 102 enables detection and response to a device emitting an electromagnetic waveform, even when details (such as location and signal characteristics) of the device emitting the electromagnetic waveform are not known in advance.

As a specific use case example, the device 102 can be used to counter improvised explosive devices (IED). For example, some IEDs include a radio receiver connected such that the IED detonates responsive to receiving a signal from a remote radio transmitter. A variety of transmitter/receiver configurations can be used depending on availability and range. In an IED detection use case, the device 102 can be programmed (e.g., by configuring the SDR instructions 130 and the response instructions 132) to detect a large number of different types of transmitters based, for example, on availability in a particular geographic area and effective detection range of each transmitter. To illustrate, low-end garage door openers (e.g., garage door openers that use a fixed frequency) may be commonly available in a particular area, whereas high-end garage door openers (e.g., frequency hopping garage door openers) may be uncommon. In this example, the device 102 can be configured to scan a range of frequencies commonly used by fixed frequency garage door openers to detect potential trigger devices. In this example, when an electromagnetic waveform is detected and determined with high confidence be associated with a garage door (e.g., based on operation of a machine-learning classifier trained to detect such garage door openers), the device 102 may initiate transmission of a jamming signal to inhibit triggering of the IED.

It should be noted that in the description above, various functions performed by the device 102 of FIGS. 1-8 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIGS. 1-8 are integrated into a single component or module. In a particular aspect, one or more functions described herein as performed by the device 102 are divided amongst multiple devices (e.g., multiple cooperating instances of the device 102). Each component or module illustrated in FIGS. 1-8 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The memory device(s) 108 of FIG. 1 include volatile memory devices (e.g., random access memory (RAM) devices), nonvolatile memory devices (e.g., read-only memory (ROM) devices, programmable read-only memory, and flash memory), or both. In a particular aspect, the memory device(s) 108 include one or more applications (e.g., instructions) executable by the processor(s) 106 to initiate, control, or perform one or more operations described herein. In an illustrative example, a computer-readable storage device is a non-transitory device (e.g., the memory device(s) 108) that includes the instructions 122 which, when executed by the processor(s) 106, cause the processor(s) 106 to initiate, perform, or control operations described herein.

The electromagnetic waveform 104 of FIGS. 1-8 can include any frequency or set of frequencies that can be detected by the device 102. Additionally, the electromagnetic waveform 104 may or may not encode a signal. For example, a signal can be encoded (via modulation) in radio waves (e.g., electromagnetic waves with a frequency from about few hertz (Hz) to about 300 megahertz (MHz)), microwaves (e.g., electromagnetic waves with a frequency from about 300 MHz to about 300 gigahertz (GHz)), or light waves (e.g., electromagnetic waves with a frequency between about 300 GHz to about 750 terahertz (THz)) that are detectable by the device 102. To illustrate, the signal can include or correspond to a modulated radio wave or a modulated light wave. In some portions of the description herein, the electromagnetic waveform 104 is described in terms of frequency; however, the electromagnetic waveform 104 can equivalently be described in terms of wavelength. There are several naming conventions for the various frequency ranges of the electromagnetic spectrum; thus, the ranges and names used herein should not be considered limiting.

Figure 9A:
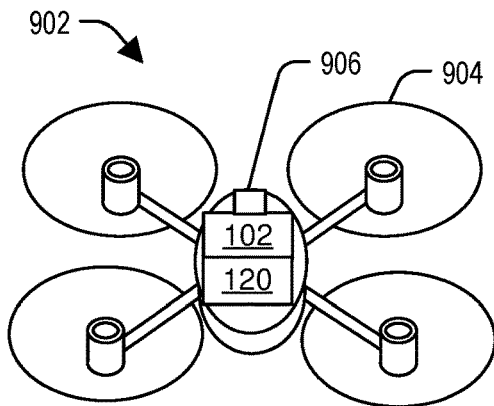
FIGS. 9A, 9B, 9C, 9D, and 9E illustrate various examples of systems that include the device of FIG. 1.
Figure 9B:
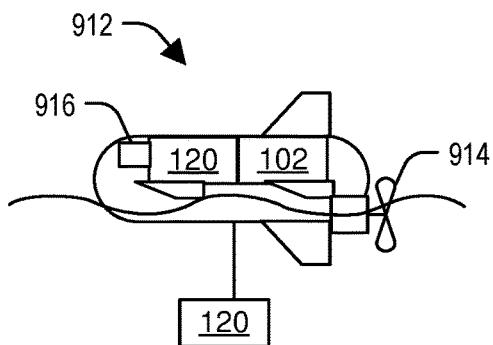
Figure 9C:
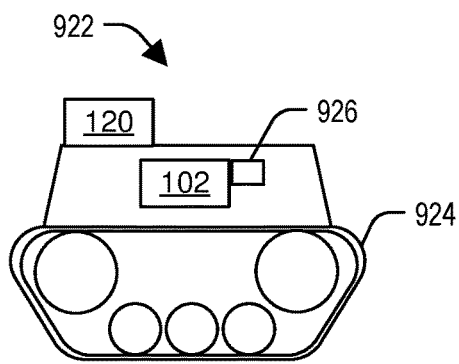
Figure 9D:
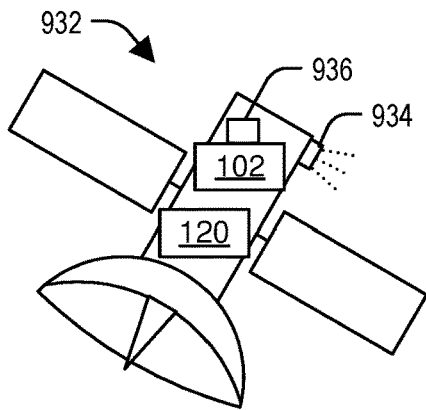
Figure 9E:
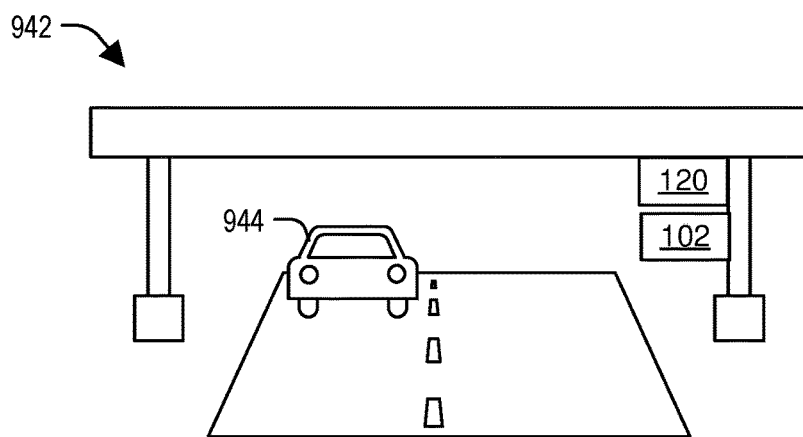

FIGS. 9A, 9B, 9C, 9D, and 9E illustrate various examples of systems that include the device 102. In the example illustrated in FIG. 1, the device 102 may be a standalone device, such as a portable or handheld device. For example, while not shown in FIG. 1, the device 102 of FIG. 1 may include an independent power supply, such as a battery or a fuel cell. In each of FIGS. 9A-9D, the device 102 is coupled to a vehicle and may operate independently of the vehicle (e.g., using its own power supply) or cooperatively with the vehicle. For example, the vehicle can provide power to the device 102 and/or the device 102 can provide commands to control operations of the vehicle. In FIG. 9E, the device 102 is stationary and can be independently powered, or powered by an infrastructure power system (e.g., wireline power from a power distribution network).

In FIG. 9A, the device 102 is coupled to an aerial vehicle 902 (e.g., an airplane, a helicopter, an unmanned aerial vehicle, such as a quadcopter drone, etc.) that includes a propulsion system 904 to enable movement (including flight) of the aerial vehicle 902. In the example illustrated in FIG. 9A, the propulsion system 904 includes a plurality of rotors; however, in other examples, the propulsion system 904 includes one or more other mechanisms, such as ducted fans, jets, or rockets, to enable flight.

The aerial vehicle 902 includes a control system 906, which may include or correspond to the controller 808 of FIG. 8, the response system 810 of FIG. 8, or a combination thereof. When the aerial vehicle 902 is unmanned, the control system 906 is configured to autonomously control basic flight operations of the aerial vehicle 902 such as inflight stability, take off, landing, and navigation. In some implementations, the control system 906 is coupled to or communicates with the device 102, the sensor(s) 120, or both. To illustrate, the control system 906 can control flight of the aerial vehicle 902 based on sensor data provided by the sensor(s) 120 (such as ranging data, image data, etc.). In some implementations, the device 102 provides commands to the control system 906 based on a response action that is selected based on a received electromagnetic waveform. For example, the device 102 may command the control system 906 to take off, to land, or to navigate to a particular position based on the received electromagnetic waveform.

In FIG. 9B, the device 102 is coupled to an aquatic vehicle 912 (e.g., a ship, a submarine, an unmanned surface water vehicle, an unmanned underwater vehicle, or an unmanned submersible vehicle that is configured to operation on the surface or underwater). The aquatic vehicle 912 includes a propulsion system 914 to enable movement of the aquatic vehicle 912 on or through water. In the example illustrated in FIG. 9B, the propulsion system 914 includes an open propeller; however, in other examples, the propulsion system 914 includes one or more other propulsion mechanisms, such as a ducted propeller or a water jet.

The aquatic vehicle 912 also includes a control system 916, which may include or correspond to the controller 808 of FIG. 8, the response system 810 of FIG. 8, or a combination thereof. When the aquatic vehicle 912 is unmanned, the control system 916 is configured to control basic aquatic operation of the aquatic vehicle 912 such as stability, buoyancy, and navigation. In some implementations, the control system 916 is coupled to or communicates with the device 102, the sensor(s) 120, or both. To illustrate, the control system 916 can control navigation of the aquatic vehicle 912 based on sensor data provided by the sensor(s) 120 (such as sonar or other audio data, image data, etc.). In some implementations, the device 102 provides commands to the control system 916 based on a response action that is selected based on a received electromagnetic waveform. For example, the device 102 may command the control system 916 to surface, submerge, or to navigate to a particular position based on the received electromagnetic waveform.

In FIG. 9C, the device 102 is coupled to a land vehicle 922 (e.g., a car, a truck, a train, a tank, or an unmanned land vehicle). The land vehicle 922 includes a propulsion system 924 to enable movement of the land vehicle 922 over terrain. In the example illustrated in FIG. 9C, the propulsion system 924 includes treads; however, in other examples, the propulsion system 924 includes one or more other land propulsion mechanisms, such as wheels, rollers, or legs.

The land vehicle 922 also includes a control system 926, which may include or correspond to the controller 808 of FIG. 8, the response system 810 of FIG. 8, or a combination thereof. When the land vehicle 922 is unmanned, the control system 926 is configured to control basic operations of the land vehicle 922, such as stability and navigation. In some implementations, the control system 926 is coupled to or communicates with the device 102, the sensor(s) 120, or both. To illustrate, the control system 926 can control navigation of the land vehicle 922 based on sensor data provided by the sensor(s) 120 (such as audio data, image data, etc.). In some implementations, the device 102 provides commands to the control system 926 based on a response action that is selected based on a received electromagnetic waveform. For example, the device 102 may command the control system 926 to navigate to a particular position based on the received electromagnetic waveform.

In FIG. 9D, the device 102 is coupled to a space vehicle 932 (e.g., a space station, a launch vehicle, or a satellite). The space vehicle 932 includes a propulsion system 934 to enable movement or orbital control of the space vehicle 932. In the example illustrated in FIG. 9D, the propulsion system 934 includes a reaction engine that expels mass to provide propulsion; however, in other examples, the propulsion system 934 includes one or more other propulsion mechanisms, such as a solar sail, an ion thruster, etc. The space vehicle 932 also includes a control system 936, which may include or correspond to the controller 808 of FIG. 8, the response system 810 of FIG. 8, or a combination thereof. When the space vehicle 932 is unmanned, the control system 936 is configured to control basic operations of the space vehicle 932 such as orbital control, directionality or orientation, and navigation. In some implementations, the control system 936 is coupled to or communicates with the device 102, the sensor(s) 120, or both. To illustrate, the control system 936 can control orientation of the space vehicle 932 based on sensor data provided by the sensor(s) 120 (such as inertial navigation data, radar, or image data, etc.). In some implementations, the device 102 provides commands to the control system 936 based on a response action that is selected based on a received electromagnetic waveform. For example, the device 102 may command the control system 936 to aim a sensor or a weapon system of the space vehicle 932 to a particular position based on the received electromagnetic waveform.

In FIG. 9E, the device 102 is stationary and coupled to an infrastructure system 942, such as a bridge or overpass. In the example illustrated in FIG. 9E, the device 102 can be used for data collection (e.g., to count or classify vehicles 944 or other equipment that pass by or use the infrastructure system 942). In some implementations, the device 102 can also provide commands to other device (e.g., one or more of the vehicles 902, 912, 922, 932 of FIGS. 9A-9D) based on a received electromagnetic waveform. For example, the device 102 may instruct the control system 936 to aim a sensor or a weapon system of the space vehicle 932 to a particular position based on an electromagnetic waveform received by the device 102 of FIG. 9E.

Figure 10A:
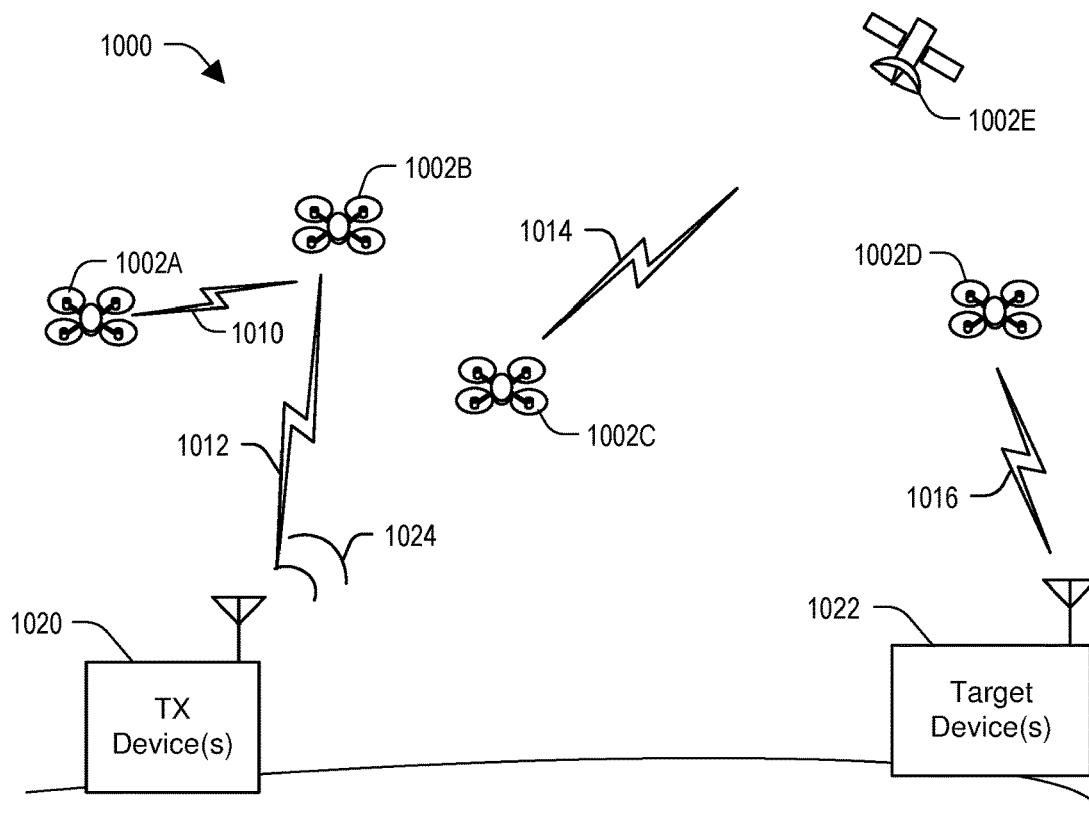
FIGS. 10A and 10B illustrate various examples of operations that can be performed by a system that includes one or more instances of the device of FIG. 1.
Figure 10B:
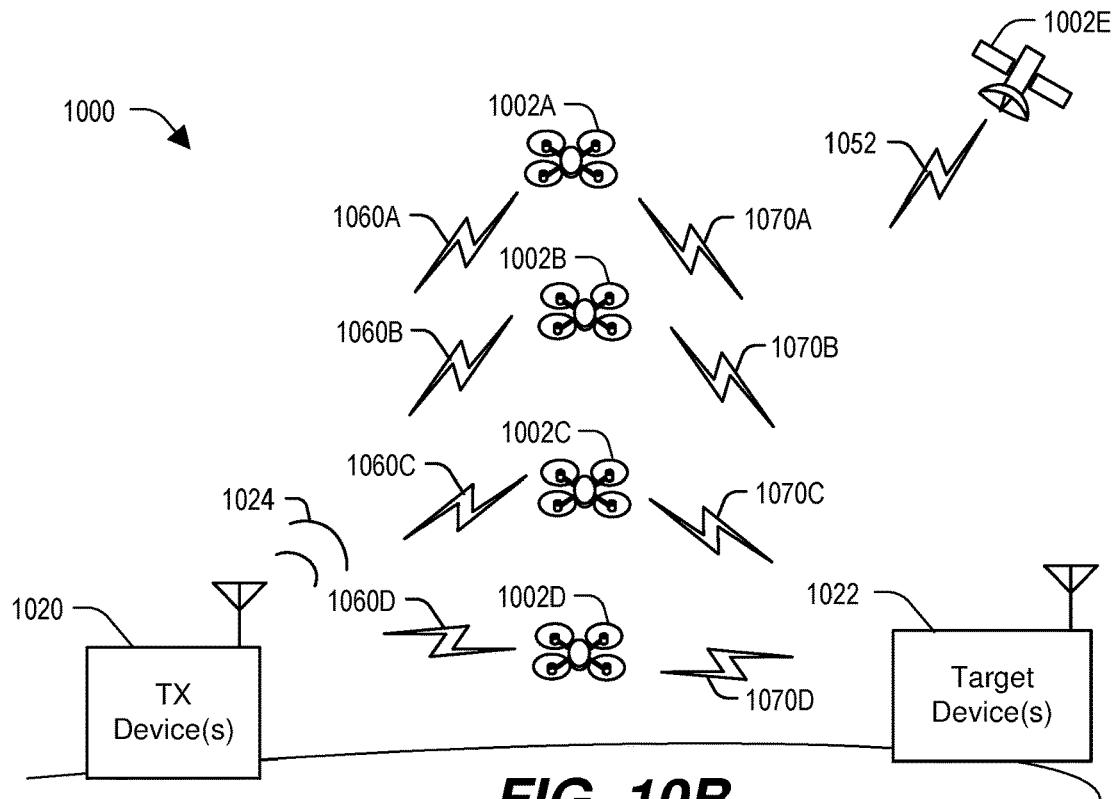

Each of the devices 102 of FIGS. 1 and 9A-9E can cooperate with other devices (e.g., peer devices or command and control devices) to analyze detected electromagnetic waveforms, to select response actions, or to perform response actions. For example, in response to the device 102 of the aerial vehicle 902 detecting an electromagnetic waveform having particular characteristics, the control system 906 of the aerial vehicle 902 may send an instruction to the land vehicle 922 to capture sensor data. In this example, the device 102 of land vehicle 922, the device 102 of the aerial vehicle 902, or another instance of the device 102 may select a response action based on the characteristics of the electromagnetic waveform and the sensor data. As another example, a particular instance of the device 102 may select a response action that includes coordinated or cooperative operation of multiple vehicles. To illustrate, one of the devices 102 may select a response action that corresponds to a swarm response to the electromagnetic signal. FIGS. 10A and 10B illustrate specific examples of response actions, some of which are cooperative or coordinated.

FIGS. 10A and 10B illustrate various examples of operations that can be performed by a system 1000 that includes one or more instances of the device 102 of FIG. 1. In FIGS. 10A and 10B, one or more transmitting devices 1020 are transmitting signal(s) 1024 to or toward one or more target devices 1022. In some instances, the signals(s) 1024 are communication signals intended to provide information to the target device(s) 1022. In other instances, the signal(s) 1024 are radar or lidar signals intended to gather information about the target device(s) 1022.

FIGS. 10A and 10B also illustrate multiple vehicles 1002, one or more of which include an instance of the device 102 of FIG. 1. To illustrate, the vehicles 1002 in FIGS. 10A and 10B include multiple aerial vehicles 1002A-1002D, one or more of which is an instance of the aerial vehicle 902 of FIG. 9A. The vehicles 1002 in FIGS. 10A and 10B also include a space vehicle 1002E, which may be an instance of the space vehicle 932 of FIG. 9D. Although not illustrated in FIGS. 10A and 10B, the system 1000 of FIGS. 10A and 10B can include one or more of the aquatic vehicle 912 of FIG. 9B, one or more of the land vehicle 922 of FIG. 9C, one or more of the infrastructure system 942 of FIG. 9E, or any combination thereof, in addition to the vehicles 1002 or instead of one or more of the vehicles 1002. Further, although FIGS. 10A and 10B illustrate five vehicles, in other implementations, the system 1000 includes more than five vehicles, fewer than five vehicles, or one or more infrastructure devices in addition to, or in place of, one or more of the vehicles.

FIG. 10A illustrates various individual or cooperative response actions, and FIG. 10B illustrates an example of a swarm response action. In FIG. 10A, one or more of the vehicles 1002 receive an electromagnetic waveform(s) encoding the signal(s) 1024 transmitted by the transmitting device(s) 1020 and select and perform a response action as described with reference to FIG. 1 and/or with respect to the methods of FIGS. 11-13.

In FIG. 10A, the vehicle 1002A has selected a peering response action based on characteristics of an electromagnetic waveform received by a device 102 of the vehicle 1002A. To perform the peering response action, the vehicle 1002A is illustrated transmitting a peering signal 1010 to one or more of the other vehicles 1002. The peering signal 1010 includes an instruction, a command, or a request, for the one or more of the other vehicles 1002 to respond cooperatively with the vehicle 1002A. For example, the peering signal 1010 can include a request to gather or transmit sensor data, a request to assist with analysis of the received electromagnetic waveform, or a request to initiate a swarm response as described further with reference to FIG. 10B.

In FIG. 10A, the vehicle 1002B has selected to perform a jamming response action based on characteristics of an electromagnetic waveform received by a device 102 of the vehicle 1002B or based on the peering signal 1010. To perform the jamming response action, the vehicle 1002B transmits a jamming signal 1012 toward one or more of the transmitting device(s) 1020 or toward one or more of the target device(s) 1022. The jamming signal 1012 is configured to disrupt reception of the signal(s) 1024 by the target device(s) 1022 when the signal(s) 1024 are communication signals. For example, the jamming signal 1012 may be directed at the target device(s) 1022 in an attempt to hide the signal 1024 in an overwhelming signal, to overwhelm (e.g., exceed a power capacity of) a receiver of the target device(s) 1022, or to otherwise interfere with reception of the signal(s) 1024 by the target device(s) 1022. When the signal(s) 1024 are radar or lidar signals, the jamming signal 1012 is configured to disrupt reception of signal returns (e.g., portions of the signal(s) 1024 reflected by the target device(s) 1022) at the transmitting device(s) 1020. For example, the jamming signal 1012 may be directed at one of the transmitting device(s) 1020 in an attempt to hide the signal returns in an overwhelming signal, to overwhelm (e.g., exceed a power capacity of) a receiver of the transmitting device(s) 1020, or to otherwise interfere with reception of the signal returns.

In FIG. 10A, the vehicle 1002C has selected a reporting response action based on characteristics of an electromagnetic waveform received by a device 102 of the vehicle 1002C. To perform the reporting response action, the vehicle 1002C is illustrated transmitting a signal 1014 that includes information collected by or determined by the vehicle 1002C to one or more of the other vehicles 1002. A reporting signal may additionally or alternatively be transmitted to an external system of device (not shown in FIG. 10A). The information transmitted via the signal 1014 may include, for example, sensor data, location data, or analysis/prediction data. To illustrate, the information may include any one or more of: the waveform data 150, the sensor data 152, the decoded symbol(s) 154, the location data 164, data indicating the future action 166, data indicating the future position 168, data indicating the movement direction 170, the device type 158 of FIG. 1 or other information determined by the vehicle 1002C based on the electromagnetic waveform. In FIG. 10A, the vehicle 1002E is operating as a monitoring device to receive and store information passed on from the other vehicles 1002.

In FIG. 10A, the vehicle 1002D has selected a spoofing response action based on characteristics of an electromagnetic waveform received by a device 102 of the vehicle 1002D. To perform the spoofing response action, the vehicle 1002D transmits a spoofing signal 1016 toward one or more of the target device(s) 1022 or one or more of the transmitting device(s) 1020. For example, when the signal(s) 1024 are communication signals, the spoofing signal 1016 may be transmitted toward the target device(s) 1022 to cause the target device(s) 1022 to ignore or respond improperly to the signal(s) 1024 from the transmitting device(s) 1020. In this example, the spoofing signal 1016 is configured to cause the target device(s) 1022 to determine that a signal from the vehicle 1002D is a signal from one of the transmitting device(s) 1020. In some implementations, depending on the particular communication protocol in use, the spoofing signal 1016 emulates the signal 1024 from the transmitting device(s) 1020 in that header information, communication protocol and other characteristics of the signal(s) 1024 are replicated. However, in such implementations, the spoofing signal 1016 may include different payload or command than the signal(s) 1024 to cause the target device(s) 1022 to respond differently than would have been the case had the signal(s) 1024 been received in the absence of the spoofing signal 1016. In other implementations, the spoofing signal 1016 is configured to cause target device(s) 1022 to form a one-to-one communication session with the vehicle 1002D so that the target device(s) 1022 ignore the signal(s) 1024 from the transmitting device(s) 1020.

When the signal(s) 1024 are radar or lidar signals, the spoofing signal 1016 may be transmitted toward the transmitting device(s) 1020 to imitate signal returns. In this example, the spoofing signal 1016 is configured to cause the transmitting device(s) 1020 to determine that the spoofing signal 1016 is a signal return including a portion of the signal 1024 reflected by the target device(s) 1022.

Although FIG. 10A illustrates each vehicle 1002 independently detecting the signal(s) 1024 and independently selecting a response action, in other implementations, the vehicles 1002 operate cooperatively to detect the signal(s) 1024 and/or to select response actions. To illustrate, in some implementations, the process of electromagnetic waveform analysis and response action selection can be performed in a distributed manner. In such implementations, for example, one or more of the vehicles 1002 receive an electromagnetic waveform and provide data descriptive of the electromagnetic waveform to one or more other vehicles 1002. In some such implementations, different aspects of analysis of the electromagnetic waveform can be performed by different ones of the vehicles 1002. To illustrate, one or more of the vehicles 1002 can perform signal detection operations to determine whether the electromagnetic waveform encodes a signal 1024 and one or more other of the vehicles 1002 can gather and process sensor data based on the electromagnetic waveform (e.g., perform image analysis to attempt to identify an image of a transmitting device 1020). As another example, response actions can be selected or performed cooperatively. To illustrate, two or more of the vehicles can share processing resources to attempt to decode one or more symbols of the signal(s) 1024 or to attempt to generate data to be encoded in a spoofing signal 1016. To illustrate, in some examples one or more of the vehicles 1002 may store at least a portion of the signal 1024 in a digital RF memory and retransmit the stored portion or a modified version of the stored version of the signal 1024 to confuse sensors of the target device(s) 1022. As one specific example, when the target device(s) 1022 include improvised explosive devices (IEDs), the stored portion of the signal 1024 (possibly with other stored signals) may retransmitted over a wide area (e.g., several blocks) in advance of a protected asset to trigger the IEDs before the protected asset arrives at a location near the IEDs. In some examples, a response action performed by an individual vehicle 1002 can include physical aspects, such as movement of that vehicle 1002 to influence signal transmission or reception at the vehicle 1002, at the transmitting device(s) 1020, at the target device(s) 1022, or at some other device.

FIG. 10B illustrates a particular example of cooperative response by the vehicles 1002. In FIG. 10B, the vehicle 1002E has sent a signal 1052 including an instruction or command to initiate a swarming response action. The swarming response action can include physical and/or electromagnetic aspects, both of which are illustrated in FIG. 10B. To physically perform the swarming response action, two or more of the vehicles 1002 move in an orchestrated manner, generally to confuse one of the devices 1020, 1022 or to provide physical obstruction between the devices 1020, 1022. To illustrate, the physical aspect of the swarming response action can include positioning two or more of the vehicles between a transmitting device 1020 and a target device 1022 to cause signal reflections, signal multipath, and/or other disruptions. This physical swarm response may be particularly effective when the transmitting device(s) 1020 are transmitting radar or other ranging signals in an attempt to determine a range or direction to a target device 1022.

Electromagnetic aspects of the swarming response action can include transmitting jamming signals 1060 and/or spoofing signals 1070. In the example illustrated in FIG. 10B, each of the vehicles 1002 is transmitting a jamming signal 1060 and each of the vehicles 1002 is transmitting a spoofing signal 1070. In other examples, different combinations of signals can be transmitted by the vehicles 1002 acting as a swarm. For example, some radar systems are designed to operate in a manner that makes detection, jamming, and spoofing difficult. To illustrate, the transmitting device(s) 1020 may use coded pulses and/or irregular scan patterns to make it more difficult to detect and/or counteract the signals(s) 1024. By swarming, the vehicles 1002 are able to cover a wide geographic or spatial area to cooperatively detect irregular scan patterns. Additionally, by sharing processing resources, the vehicles can detect and/or replicate coded pulses to generate appropriate jamming signals 1060 or spoofing signals 1070. Further, even if the shared processing resources are not used or are not able to definitively detect and replicate the signals 1024, the swarming vehicles can take other actions, such as assigning each vehicle a range of jamming or spoofing signals 1060, 1070 to increase the probability that at least one of the jamming or spoofing signals 1060, 1070 will function to interfere with operation of the transmitting device(s) 1020 or the target device(s) 1022.

As a specific example, if the transmitting device(s) 1020 are using frequency hopping techniques to avoid jamming or detection, the ML model(s) 140 of one or more of the vehicles 1002 can predict signal characteristics (e.g., frequency) of a jamming signal that may be effective by selecting one or more set of jamming signal characteristics (e.g., one for each vehicle 1002 of a swarm) representing a predicted most probable set of frequencies to be used by the transmitting device 1020 in subsequent transmissions. Thus, active jamming by the vehicles 1002 may be effective even against sophisticated frequency hopping transmitters by predicting a group (e.g., two or more) most likely frequencies to be used for future signals. Even if the predictions are not perfect, the group of signals transmitted by the vehicles 1002 significantly increase noise, which may reduce detection efficiency, and when one or more of the predictions is correct, there is a very low chance of signal detection and decoding by the target device(s) 1022.

In another aspect, the ML model(s) 140 of one or more of the vehicles 1002 can determine where to position one or more of the vehicles 1002 to improve jamming. To illustrate, when transmitting device(s) 102 use beamforming to direct relatively tight beam communication signals to the target device(s) 1022, the ML model(s) 140 can predict locations at which to position the vehicles 1002 to reduce signal strength of the signals detected at the target device(s) 1022 (e.g., due to absorption, reflection, scattering, or blocking of the signals by one or more of the vehicles 1002). In some situations, moving the vehicles 1002 in a pattern or randomly can further disrupt communication by making signal multipath difficult to remove from the signals received by the target device(s) 1022. In some implementations, one or more of the vehicles 1002 may be equipped with a signal reflection surface, which may be selectively deployable or permanently attached. When the signal reflection surface is deployable, the ML model(s) 140 may determine when to deploy the signal reflection surface and how to deploy the signal reflection surface. For example, the ML model(s) 140 can determine a pointing direction for a directional signal reflection device. As another example, the ML model(s) 140 can determine a deployment altitude and location for a particular type of chaff. To illustrate, the timing and location of deployment of the signal reflection surface may be based on a predicted future location of one or more of the transmitting device(s) 1020 or target device(s) 1022.

Figure 11:
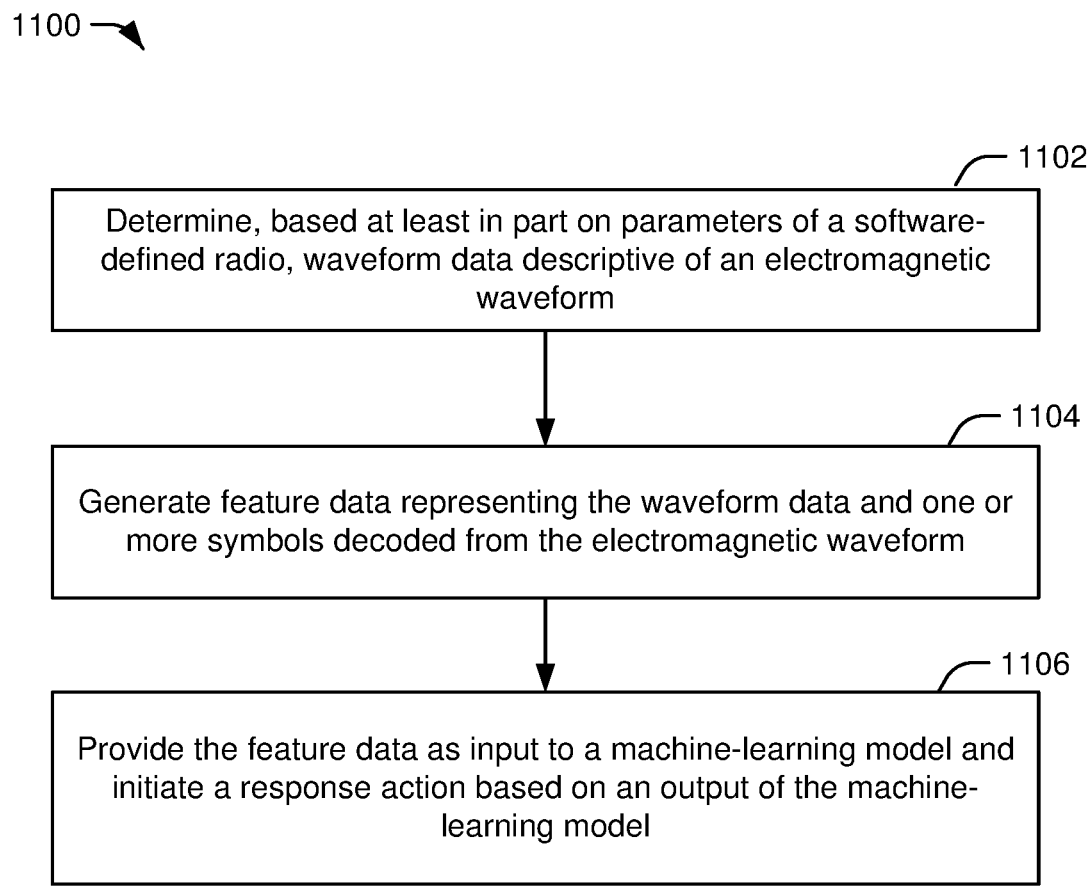
FIG. 11 is a flow chart of an example of a method that can be initiated, controlled, or performed by the system of FIG. 1.

FIG. 11 is a flow chart of an example of a method 1100 that can be initiated, controlled, or performed by the system 100 of FIG. 1. For example, the device 102 can initiate, control, or perform the method 1100 or portions thereof in response to execution of the instructions 122 by the processor(s) 106.

The method 1100 includes, at 1102, determining, based at least in part on parameters of a software-defined radio (SDR), waveform data descriptive of an electromagnetic waveform. For example, the electromagnetic waveform can include radiofrequency waves, light waves, microwaves, or a combination thereof, that are modulated to encode a signal. The electromagnetic waveform can be received via an antenna or a frequency-appropriate sensor, such as a light sensor to receive light waves. In some implementations, the parameters of the SDR are selected by a machine-learning model that is trained to tune the SDR to scan an electromagnetic spectrum for waveforms of interest.

The parameters of the SDR cause converters (e.g., receiver circuitry) to generate a digital representation of at least a portion of the electromagnetic waveform, which may be used to generate the waveform data. For example, the SDR instructions 130 can set the parameters 114 of the converter(s) 112 to cause the converter(s) 112 to generate a bitstream and/or packets representing the portion of the electromagnetic waveform. The converter(s) 112 may also decode one or more symbols encoded in a signal the electromagnetic waveform. The waveform data may represent attributes of the electromagnetic waveform itself, such as amplitude, frequency, variability, etc. The waveform data may additionally, or alternatively, represent attributes of a signal encoded in the electromagnetic waveform, such as a baseband frequency, a modulation type, a relative signal strength metric, or a combination thereof. In some implementations, the waveform data is generated by providing the digital representation of at least a portion of the electromagnetic waveform as input to a machine-learning model that is trained to generate the waveform data. In other implementations, the waveform data is generated by comparing the digital representation of at least a portion of the electromagnetic waveform to mapping data.

The method 1100 also includes, at 1104, generating feature data based on the waveform data and based on one or more symbols decoded from the electromagnetic waveform. The decoded symbol(s) may include unencrypted data detected in the signal, such as one or more bits of data in a header of a packet of the signal. In a particular example, the feature data is generated by providing the waveform data and the one or more symbols as input to a machine-learning model that is trained to generate the feature data. In other examples, the feature data is determined by comparing the waveform data, the one or more symbols, or both, to one or more heuristics or rules. In some examples, the waveform data is used to generate a first feature vector, and the one or more decoded symbols are used to generate a second feature vector that is based on the unencrypted data to form the feature data. Each of the first and second feature vectors can be determined using heuristics, one or more machine-learning models, or a combination thereof. For example, each modulation type that is detectable by the SDR instructions 130 can be mapped, via a rule, to a respective value. In this illustrative example, a value of a field of the first feature vector is determined by comparing the modulation characteristics to the rule to determine the value. Values of other fields of the first feature vector can be determined based on other rules 162. The first and second feature vectors can be concatenated or mathematically or logically combined to form the feature data.

The method 1100 further includes, at 1106, providing the feature data as input to a machine-learning model and initiating a response action based on an output of the machine-learning model. For example, the feature data can be provided as input to a classifier that is trained to determine the device type 158 of a device that generated the electromagnetic waveform. In this example, the device type 158 can be used to select a response action (e.g., using one or more rules or another machine-learning model, such as a decision model 142). Examples of response actions include, without limitation, acquiring and storing data (such as location data or sensor data), transmitting data to another device, transmitting another signal (such as a command, a jamming signal or a spoofing signal), initiate station keeping operations, moving to another location, generating a notification, directing response resources, initiating or participating in a swarming response, etc.

Figure 12:
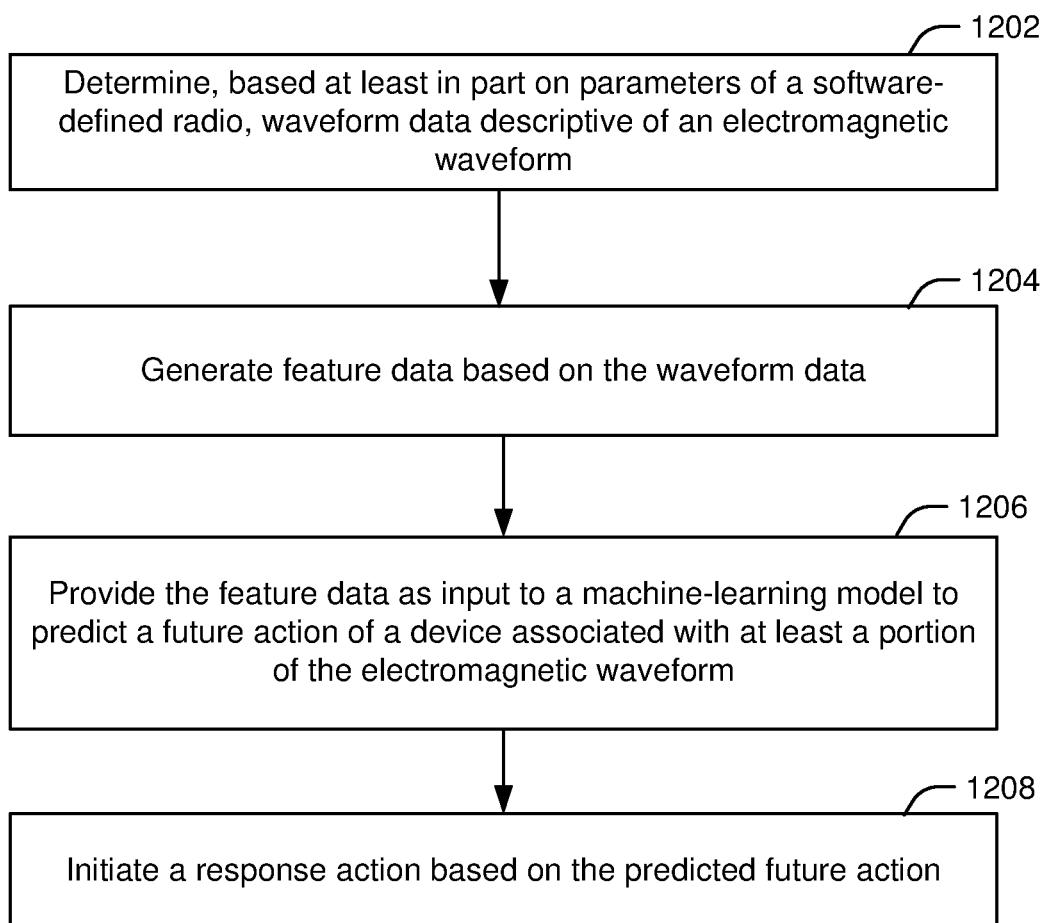
FIG. 12 is a flow chart of another example of a method that can be initiated, controlled, or performed by the system of FIG. 1.

FIG. 12 is a flow chart of an example of a method 1200 that can be initiated, controlled, or performed by the system 100 of FIG. 1. For example, the device 102 can initiate, control, or perform the method 1200 or portions thereof in response to execution of the instructions 122 by the processor(s) 106.

The method 1200 includes, at 1202, determining, based at least in part on parameters of a software-defined radio (SDR), waveform data descriptive of an electromagnetic waveform. For example, the electromagnetic waveform can include radiofrequency waves, light waves, microwaves, or a combination thereof. For the method 1200 of FIG. 12, the electromagnetic waveform may or may not encode a signal. For example, in some implementations the electromagnetic waveform may be modulated by a transmitter to encode a signal, and in other implementations the electromagnetic waveform may be a byproduct of operation of a device, such as an electrical or electromechanical device. The electromagnetic waveform can be received via an antenna or a frequency-appropriate sensor, such as a light sensor to receive light waves. In some implementations, the parameters of the SDR are selected by a machine-learning model that is trained to tune the SDR to scan an electromagnetic spectrum for waveforms of interest.

The parameters of the SDR cause converters (e.g., receiver circuitry) to generate a digital representation of at least a portion of the electromagnetic waveform, which may be used to generate the waveform data. For example, the SDR instructions 130 can set the parameters 114 of the converter(s) 112 to cause the converter(s) 112 to generate a bitstream and/or packets representing the portion of the electromagnetic waveform. If the electromagnetic waveform encodes a signal, the converter(s) 112 may also decode one or more symbols of the signal. The waveform data may represent attributes of the electromagnetic waveform itself, such as amplitude, frequency, variability, etc. The waveform data may also, or in the alternative, represent attributes of a signal encoded in the electromagnetic waveform, such as a baseband frequency, a modulation type, a relative signal strength metric, or a combination thereof. In some implementations, the waveform data is generated by providing the digital representation of at least a portion of the electromagnetic waveform as input to a machine-learning model that is trained to generate the waveform data. In other implementations, the waveform data is generated by comparing the digital representation of at least a portion of the electromagnetic waveform to mapping data.

The method 1200 also includes, at 1204, generating feature data based on the waveform data. In a particular example, the feature data is generated by providing the waveform data as input to a machine-learning model that is trained to generate the feature data. In other examples, the feature data is determined by comparing the waveform data to one or more heuristics or rules, such as the rules 162.

The method 1200 further includes, at 1206, providing the feature data as input to a machine-learning model that is trained to predict a future action of a device associated with at least a portion of the electromagnetic waveform. For example, the feature data (possibly with other data, such as data indicating the device type 158) can be provided as input to a machine-learning model that is trained to predict a future action 166, a future position 168, or a movement direction 170 of the device that generated the electromagnetic waveform or a target device of the electromagnetic waveform.

The method 1200 also includes, at 1208, initiating a response action based on the predicted future action. For example, the future action 166, the future position 168, the movement direction 170, or a combination thereof, can be used to select a response action (e.g., using one or more rules or another machine-learning model, such as a decision model 142). Examples of response actions include, without limitation, acquiring and storing data (such as location data or sensor data), transmitting data to another device, transmitting another signal (such as a command, a jamming signal or a spoofing signal), imitating station keeping operations, moving to another location, generating a notification, directing response resources, initiating or participating in a swarming response, etc. To illustrate, a future position of the device may be estimated, and the response action may include directing response resources based on the estimated future position.

Figure 13:
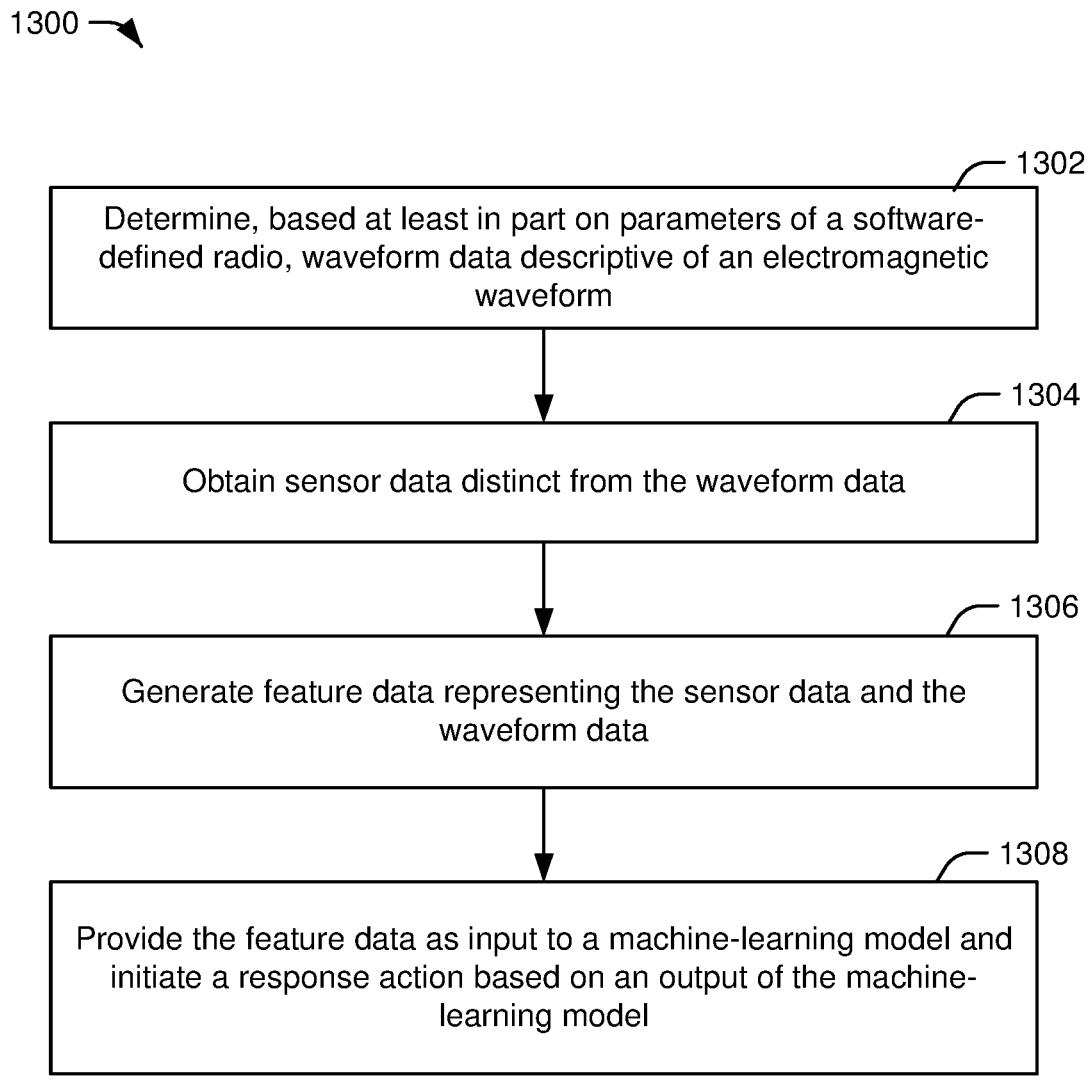
FIG. 13 is a flow chart of yet another example of a method that can be initiated, controlled, or performed by the system of FIG. 1.

FIG. 13 is a flow chart of an example of a method 1300 that can be initiated, controlled, or performed by the system 100 of FIG. 1. For example, the device 102 can initiate, control, or perform the method 1300 or portions thereof in response to execution of the instructions 122 by the processor(s) 106.

The method 1300 includes, at 1302, determining, based at least in part on parameters of a software-defined radio (SDR), waveform data descriptive of an electromagnetic waveform. For example, the electromagnetic waveform can include radiofrequency waves, a light waves, microwaves, or a combination thereof. For the method 1300 of FIG. 13, the electromagnetic waveform may or may not encode a signal. For example, the electromagnetic waveform may be modulated by a transmitter to encode a signal, and or the electromagnetic waveform may be a byproduct of operation of a device, such as an electrical or electromechanical device. The electromagnetic waveform can be received via an antenna or a frequency-appropriate sensor, such as a light sensor to receive light waves. In some implementations, the parameters of the SDR are selected by a machine-learning model that is trained to tune the SDR to scan an electromagnetic spectrum for waveforms of interest.

The parameters of the SDR cause converters (e.g., receiver circuitry) to generate a digital representation of at least a portion of the electromagnetic waveform. For example, the SDR instructions 130 can set the parameters 114 of the converter(s) 112 to cause the converter(s) 112 to generate a bitstream and/or packets representing the portion of the electromagnetic waveform. If the electromagnetic waveform encodes a signal, the converter(s) 112 may also decode one or more symbols encoded in a signal the electromagnetic waveform. The waveform data may represent attributes of the electromagnetic waveform itself, such as amplitude, frequency, variability, etc. The waveform data may additionally, or alternatively, represent attributes of a signal encoded in the electromagnetic waveform, such as a baseband frequency, a modulation type, a relative signal strength metric, or a combination thereof. In some implementations, the waveform data is generated by providing the digital representation of at least a portion of the electromagnetic waveform as input to a machine-learning model that is trained to generate the waveform data. In other implementations, the waveform data is generated by comparing the digital representation of at least a portion of the electromagnetic waveform to mapping data.

The method 1300 also includes, at 1304, obtaining sensor data that is distinct from the waveform data. For example, the sensor data can include the location data 164, image data, video data, audio data, and/or other data captured by one or more sensors 120 coupled to or integrated within the device 102 of FIG. 1. The sensor data can be read from memory, sampled from a sensor data bus, or received via a transmission from another device.

The method 1300 further includes, at 1306, generating feature data based on the sensor data and the waveform data. In a particular example, the feature data is generated by providing the sensor data and the waveform data as input to a machine-learning model that is trained to generate the feature data. In other examples, the feature data is determined by comparing the waveform data, the sensor data, or both, to one or more heuristics or rules. In some examples, the waveform data is used to generate a first feature vector, and the sensor data is used to generate a second feature vector. In such examples, each of the first and second feature vectors can be determined using heuristics, one or more machine-learning models, or a combination thereof. For example, each modulation type that is detectable by the SDR instructions 130 can be mapped, via a rule, to a respective value. In this illustrative example, a value of a field of the first feature vector is determined by comparing the modulation characteristics to the rule to determine the value. Values of other fields of the first feature vector can be determined based on the rules 162. The first and second feature vectors can be concatenated or mathematically or logically combined to form the feature data.

The method 1300 also includes, at 1308, providing the feature data as input to a machine-learning model and initiating a response action based on an output of the machine-learning model. For example, the feature data can be provided as input to a classifier that is trained to determine the device type 158 of a device that generated the electromagnetic waveform. In this example, the device type 158 can be used to select a response action (e.g., using one or more rules or another machine-learning model, such as a decision model 142). Examples of response actions include, without limitation, acquiring and storing data (such as location data or sensor data), transmitting data to another device, transmitting another signal (such as a command, a jamming signal or a spoofing signal), imitating station keeping operations, moving to another location, generating a notification, directing response resources, initiating or participating in a swarming response, etc.

As a specific example, data from a combination of multiple different types of sensors, such as acoustic sensors, electromagnetic sensors (e.g., RF sensors, IR sensors, UV sensors), vibration sensors (e.g., seismometers), magnetometers, image sensors, and so forth, can be fused to improved detection or identification of target devices or transmitting devices. The sensors can include ground-based sensors (e.g., surface mounted or sub-surface sensors), water-based sensors (e.g., surface or underwater sensors), airborne sensors, space-borne sensors, or combinations thereof. Fusion of sensor data from various types of sensors can facilitate detection or identification of objects, can facilitate selection of response actions, etc. To illustrate, sound data from an acoustic sensor, image data from an image sensor, and radar return data from a radar system can be merged to improve detection of aircraft with small radar cross-sections (e.g., so called "stealth" aircraft). As another illustrative example, image data and audio data can be fused to distinguish an unmanned aerial vehicle from a bird.

In some implementations, data from one or more sensors may be used to detect and/or classify an object and data from one or more other sensors can be used to track or predict a location or action of the object after detection and classification. To illustrate, a moving object may be detected in multiple frames of image data captured by a camera, and in response to detecting the object, one or more other sensors (e.g., a radar system, acoustic sensors, etc.) may be directed toward the object. In this example, the object may be classified or identified based on a combination of the image data and data from the one or more other sensors. Additionally, or alternatively, a location or travel path of the object may be predicted based on the image data, the data from the one or more other sensors, or a combination (e.g., fusion) thereof. Further, after an object has been detected and the location/travel path of the object have been predicted, a mission profile or goal (e.g., target) of the object can be predicted.

In some implementations, a temporary swarm of vehicles can be used to capture the sensor data. To illustrate, a set of microsatellites can be deployed over a region of interest to capture image data, electromagnetic waveforms, etc. As another example, a swarm of airborne, ground-based, water-based, or multi-domain vehicles (e.g., watercraft that can become airborne or launch aircraft) can be used to form a temporary swarm. In other aspects, a long-term (e.g., permanent or of indefinite duration) swarm of vehicles can be used to capture the sensor data. To illustrate, sensors mounted to balloons or buoys can be used to surround a protected area and to capture sensor data. In such example, the long-term vehicles may be supplemented by short-term vehicles (e.g., drones) during high-risk situations or when an object of interest is detected.

Figure 14:
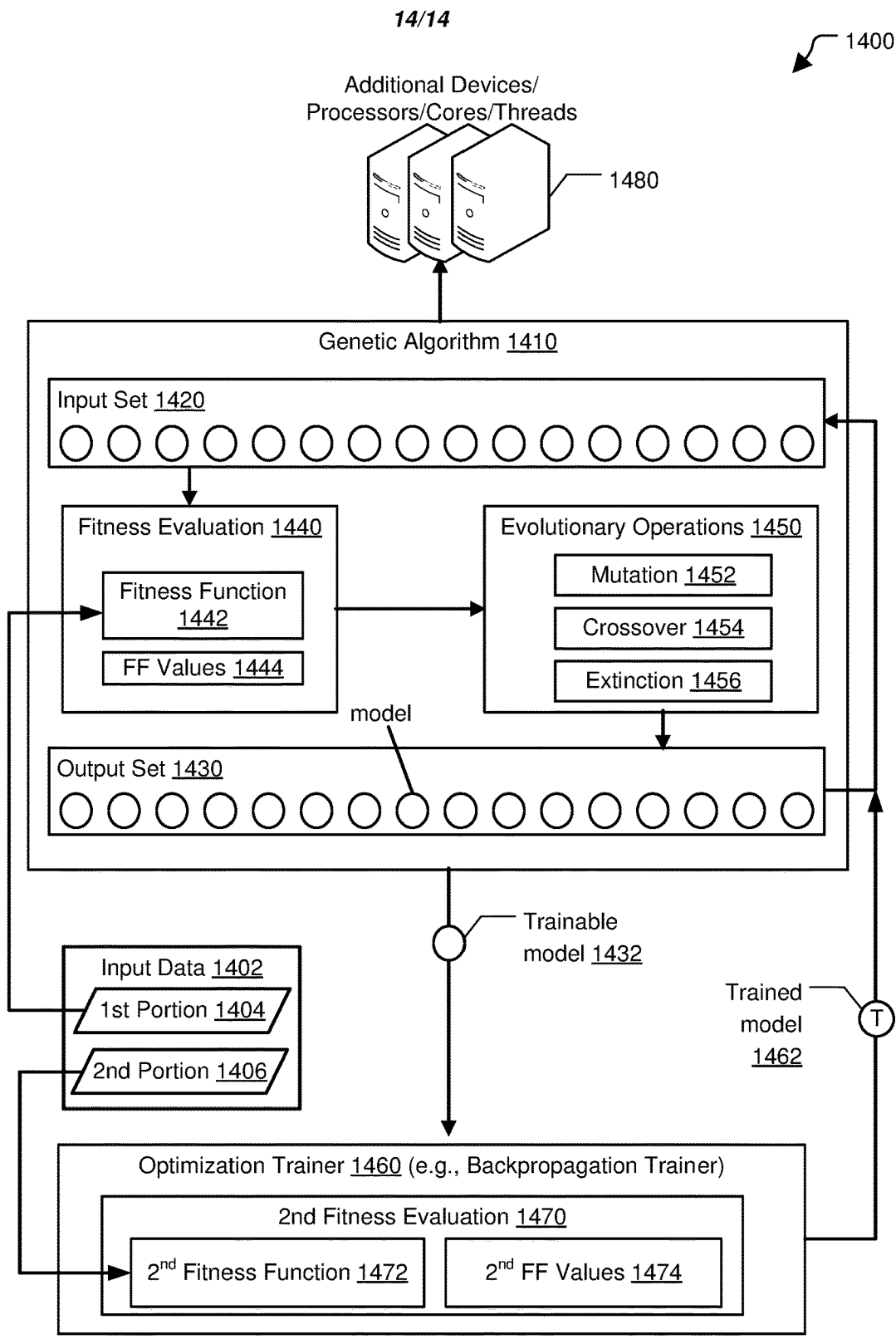
FIG. 14 is a diagram illustrating details of one example of the automated model builder instructions to generate a machine learning instructions used by the system of FIG. 1.

Referring to FIG. 14, a particular illustrative example of a system 1400 executing automated model builder instructions is shown. The system 1400, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the automated model builder instructions include a genetic algorithm 1410 and an optimization trainer 1460. The optimization trainer 1460 is, for example, a backpropagation trainer, a derivative free optimizer (DFO), an extreme learning machine (ELM), etc. In particular implementations, the genetic algorithm 1410 is executed on a different device, processor (e.g., central processor unit (CPU), graphics processing unit (GPU) or other type of processor), processor core, and/or thread (e.g., hardware or software thread) than the optimization trainer 1460. The genetic algorithm 1410 and the optimization trainer 1460 are executed cooperatively to automatically generate a machine-learning model (e.g., one or more of the machine-learning models 140 of FIG. 1 and referred to herein as "models" for ease of reference), such as a neural network or an autoencoder, based on the input data 1402. The system 1400 performs an automated model building process that enables users, including inexperienced users, to quickly and easily build highly accurate models based on a specified data set.

During configuration of the system 1400, a user specifies the input data 1402. In some implementations, the user can also specify one or more characteristics of models that can be generated. In such implementations, the system 1400 constrains models processed by the genetic algorithm 1410 to those that have the one or more specified characteristics. For example, the specified characteristics can constrain allowed model topologies (e.g., to include no more than a specified number of input nodes or output nodes, no more than a specified number of hidden layers, no recurrent loops, etc.). Constraining the characteristics of the models can reduce the computing resources (e.g., time, memory, processor cycles, etc.) needed to converge to a final model, can reduce the computing resources needed to use the model (e.g., by simplifying the model), or both.

The user can configure aspects of the genetic algorithm 1410 via input to graphical user interfaces (GUIs). For example, the user may provide input to limit a number of epochs that will be executed by the genetic algorithm 1410. Alternatively, the user may specify a time limit indicating an amount of time that the genetic algorithm 1410 has to execute before outputting a final output model, and the genetic algorithm 1410 may determine a number of epochs that will be executed based on the specified time limit. To illustrate, an initial epoch of the genetic algorithm 1410 may be timed (e.g., using a hardware or software timer at the computing device executing the genetic algorithm 1410), and a total number of epochs that are to be executed within the specified time limit may be determined accordingly. As another example, the user may constrain a number of models evaluated in each epoch, for example by constraining the size of an input set 1420 of models and/or an output set 1430 of models.

The genetic algorithm 1410 represents a recursive search process. Consequently, each iteration of the search process (also called an epoch or generation of the genetic algorithm 1410) has an input set 1420 of models (also referred to herein as an input population) and an output set 1430 of models (also referred to herein as an output population). The input set 1420 and the output set 1430 may each include a plurality of models, where each model includes data representative of a machine-learning data model. For example, each model may specify a neural network or an autoencoder by at least an architecture, a series of activation functions, and connection weights. The architecture (also referred to herein as a topology) of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tanh activation function. In such implementations, the hyperparameters of a layer include layer type, node count, activation function, and aggregation function. Further, a complete autoencoder is specified by specifying an order of layers and the hyperparameters of each layer of the autoencoder.

In a particular aspect, the genetic algorithm 1410 may be configured to perform speciation. For example, the genetic algorithm 1410 may be configured to cluster the models of the input set 1420 into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm 1410 may be configured to serialize a model into a bit string. In this example, the genetic distance between models may be represented by the number of differing bits in the bit strings corresponding to the models. The bit strings corresponding to models may be referred to as "encodings" of the models.

After configuration, the genetic algorithm 1410 may begin execution based on the input data 1402. Parameters of the genetic algorithm 1410 may include but are not limited to, mutation parameter(s), a maximum number of epochs the genetic algorithm 1410 will be executed, a termination condition (e.g., a threshold fitness value that results in termination of the genetic algorithm 1410 even if the maximum number of generations has not been reached), whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 1410 uses a single mutation parameter or set of mutation parameters for all of the models. In such examples, the mutation parameter may impact how often, how much, and/or what types of mutations can happen to any model of the genetic algorithm 1410. In alternative examples, the genetic algorithm 1410 maintains multiple mutation parameters or sets of mutation parameters, such as for individual or groups of models or species. In particular aspects, the mutation parameter(s) affect crossover and/or mutation operations, which are further described below.

For an initial epoch of the genetic algorithm 1410, the topologies of the models in the input set 1420 may be randomly or pseudo-randomly generated within constraints specified by the configuration settings or by one or more architectural parameters. Accordingly, the input set 1420 may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers, whereas the second model can include one or more recurrent layers.

The genetic algorithm 1410 may automatically assign an activation function, an aggregation function, a bias, connection weights, etc. to each model of the input set 1420 for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set 1420 of the initial epoch. Thus, the models of the input set 1420 of the initial epoch may have different topologies (which may include different input nodes corresponding to different input data fields if the data set includes many data fields) and different connection weights. Further, the models of the input set 1420 of the initial epoch may include nodes having different activation functions, aggregation functions, and/or bias values/functions.

During execution, the genetic algorithm 1410 performs fitness evaluation 1440 and evolutionary operations 1450 on the input set 1420. In this context, fitness evaluation 1440 includes evaluating each model of the input set 1420 using a fitness function 1442 to determine a fitness function value 1444 ("FF values" in FIG. 14) for each model of the input set 1420. The fitness function values 1444 are used to select one or more models of the input set 1420 to modify using one or more of the evolutionary operations 1450. In FIG. 14, the evolutionary operations 1450 include mutation operations 1452, crossover operations 1454, and extinction operations 1456, each of which is described further below.

During the fitness evaluation 1440, each model of the input set 1420 is tested based on the input data 1402 to determine a corresponding fitness function value 1444. For example, a first portion 1404 of the input data 1402 may be provided as input data to each model, which processes the input data (according to the network topology, connection weights, activation function, etc., of the respective model) to generate output data. The output data of each model is evaluated using the fitness function 1442 and the first portion 1404 of the input data 1402 to determine how well the model modeled the input data 1402. In some examples, fitness of a model is based on reliability of the model, performance of the model, complexity (or sparsity) of the model, size of the latent space, or a combination thereof.

In a particular aspect, fitness evaluation 1440 of the models of the input set 1420 is performed in parallel. To illustrate, the system 1400 may include devices, processors, cores, and/or threads 1480 in addition to those that execute the genetic algorithm 1410 and the optimization trainer 1460. These additional devices, processors, cores, and/or threads 1480 can perform the fitness evaluation 1440 of the models of the input set 1420 in parallel based on a first portion 1404 of the input data 1402 and may provide the resulting fitness function values 1444 to the genetic algorithm 1410.

The mutation operation 1452 and the crossover operation 1454 are highly stochastic under certain constraints and a defined set of probabilities optimized for model building, which produces reproduction operations that can be used to generate the output set 1430, or at least a portion thereof, from the input set 1420. In a particular implementation, the genetic algorithm 1410 utilizes intra-species reproduction (as opposed to inter-species reproduction) in generating the output set 1430. In other implementations, inter-species reproduction may be used in addition to or instead of intra-species reproduction to generate the output set 1430. Generally, the mutation operation 1452 and the crossover operation 1454 are selectively performed on models that are more fit (e.g., have higher fitness function values 1444, fitness function values 1444 that have changed significantly between two or more epochs, or both).

The extinction operation 1456 uses a stagnation criterion to determine when a species should be omitted from a population used as the input set 1420 for a subsequent epoch of the genetic algorithm 1410. Generally, the extinction operation 1456 is selectively performed on models that are satisfy a stagnation criteria, such as modes that have low fitness function values 1444, fitness function values 1444 that have changed little over several epochs, or both.

In accordance with the present disclosure, cooperative execution of the genetic algorithm 1410 and the optimization trainer 1460 is used to arrive at a solution faster than would occur by using a genetic algorithm 1410 alone or an optimization trainer 1460 alone. Additionally, in some implementations, the genetic algorithm 1410 and the optimization trainer 1460 evaluate fitness using different data sets, with different measures of fitness, or both, which can improve fidelity of operation of the final model. To facilitate cooperative execution, a model (referred to herein as a trainable model 1432 in FIG. 14) is occasionally sent from the genetic algorithm 1410 to the optimization trainer 1460 for training. In a particular implementation, the trainable model 1432 is based on crossing over and/or mutating the fittest models (based on the fitness evaluation 1440) of the input set 1420. In such implementations, the trainable model 1432 is not merely a selected model of the input set 1420; rather, the trainable model 1432 represents a potential advancement with respect to the fittest models of the input set 1420.

The optimization trainer 1460 uses a second portion 1406 of the input data 1402 to train the connection weights and biases of the trainable model 1432, thereby generating a trained model 1462. The optimization trainer 1460 does not modify the architecture of the trainable model 1432.

During optimization, the optimization trainer 1460 provides a second portion 1406 of the input data 1402 to the trainable model 1432 to generate output data. The optimization trainer 1460 performs a second fitness evaluation 1470 by comparing the data input to the trainable model 1432 to the output data from the trainable model 1432 to determine a second fitness function value 1474 based on a second fitness function 1472. The second fitness function 1472 is the same as the first fitness function 1442 in some implementations and is different from the first fitness function 1442 in other implementations. In some implementations, the optimization trainer 1460 or portions thereof is executed on a different device, processor, core, and/or thread than the genetic algorithm 1410. In such implementations, the genetic algorithm 1410 can continue executing additional epoch(s) while the connection weights of the trainable model 1432 are being trained by the optimization trainer 1460. When training is complete, the trained model 1462 is input back into (a subsequent epoch of) the genetic algorithm 1410, so that the positively reinforced "genetic traits" of the trained model 1462 are available to be inherited by other models in the genetic algorithm 1410.

In implementations in which the genetic algorithm 1410 employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 1410 may maintain a data structure that tracks the fitness of each species across multiple epochs. Based on the species fitness, the genetic algorithm 1410 may identify the "fittest" species, which may also be referred to as "elite species." Different numbers of elite species may be identified in different embodiments.

In a particular aspect, the genetic algorithm 1410 uses species fitness to determine if a species has become stagnant and is therefore to become extinct. As an illustrative non-limiting example, the stagnation criterion of the extinction operation 1456 may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm 1410.

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 1430 of the epoch is generated based on the input set 1420 and the evolutionary operation 1450. In the illustrated example, the output set 1430 includes the same number of models as the input set 1420. In some implementations, the output set 1430 includes each of the "overall elite" models and each of the "elite member" models. Propagating the "overall elite" and "elite member" models to the next epoch may preserve the "genetic traits" resulted in caused such models being assigned high fitness values.

The rest of the output set 1430 may be filled out by random reproduction using the crossover operation 1454 and/or the mutation operation 1452. After the output set 1430 is generated, the output set 1430 may be provided as the input set 1420 for the next epoch of the genetic algorithm 1410.

After one or more epochs of the genetic algorithm 1410 and one or more rounds of optimization by the optimization trainer 1460, the system 1400 selects a particular model or a set of model as the final model (e.g., one of the machine-learning models 140). For example, the final model may be selected based on the fitness function values 1444, 1474. For example, a model or set of models having the highest fitness function value 1444 or 1474 may be selected as the final model. When multiple models are selected (e.g., an entire species is selected), an ensembler can be generated (e.g., based on heuristic rules or using the genetic algorithm 1410) to aggregate the multiple models. In some implementations, the final model can be provided to the optimization trainer 1460 for one or more rounds of optimization after the final model is selected. Subsequently, the final model can be output for use with respect to other data (e.g., real-time data).

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, but not limited to, C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may take the form of or include a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the actions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Particular aspects of the disclosure are described below in a first set of interrelated clauses:

According to Clause 1, a method includes determining, based at least in part on parameters of a software-defined radio (SDR), waveform data descriptive of an electromagnetic waveform; generating feature data based on the waveform data and one or more symbols decoded from the electromagnetic waveform; and providing the feature data as input to a first machine-learning model and initiating a response action based on an output of the first machine-learning model.

Clause 2 includes the method of Clause 1 and further includes selecting the parameters of the SDR using a second machine-learning model that is trained to tune the SDR to scan an electromagnetic spectrum for waveforms of interest.

Clause 3 includes the method of either of Clauses 1 or 2 and further includes determining the waveform data by providing a digital representation of at least a portion of the electromagnetic waveform as input to a third machine-learning model that is trained to generate the waveform data.

Clause 4 includes the method of either of Clauses 1 or 2 and further includes determining the waveform data by comparing a digital representation of at least a portion of the electromagnetic waveform to mapping data.

Clause 5 includes the method of any of Clauses 1 to 4 where the one or more symbols include one or more bits of data in a header of a packet of a signal encoded in the electromagnetic waveform.

Clause 6 includes the method of any of Clauses 1 to 5 where the response action includes initiating transmission of a jamming signal.

Clause 7 includes the method of any of Clauses 1 to 6 where the response action includes storing location data indicating a location associated with reception of the electromagnetic waveform.

Clause 8 includes the method of any of Clauses 1 to 7 where the response action includes sending a command to initiate a swarm response.

Clause 9 includes the method of any of Clauses 1 to 8 where the response action includes estimating a future position of a device that generated at least a portion of the electromagnetic waveform based on the waveform data and directing response resources based on the estimated future position.

Clause 10 includes the method of any of Clauses 1 to 9 where the first machine-learning model includes one or more decision trees, one or more neural networks, one or more support vector machines, or one or more prototypical networks.

Additional Clauses describe a system configured to perform one or more of the operations of any of Clauses 1 to 10 of the first set of interrelated clauses. For example, according to Clause 11, a system includes one or more interfaces configured to receive an electromagnetic waveform; one or more processors; and one or more memory devices accessible to the one or more processors. The one or more memory devices storing instructions that are executable by the one or more processors to cause the one or more processors to: determine, based at least in part on parameters of a software-defined radio (SDR), waveform data descriptive of the electromagnetic waveform; generate feature data based on the waveform data and one or more symbols decoded from the electromagnetic waveform; and provide the feature data as input to a first machine-learning model and initiating a response action based on an output of the first machine-learning model.

Clause 12 includes the system of Clause 11, where the instructions are executable by the one or more processors to cause the one or more processors to select the parameters of the SDR using a second machine-learning model that is trained to tune the SDR to scan an electromagnetic spectrum for waveforms of interest.

Clause 13 includes the system of either of Clauses 11 or 12, where the instructions are executable by the one or more processors to cause the one or more processors to determine the waveform data by providing a digital representation of at least a portion of the electromagnetic waveform as input to a third machine-learning model that is trained to generate the waveform data.

Clause 14 includes the system of any of Clauses 11 to 13, where the instructions are executable by the one or more processors to cause the one or more processors to determine the waveform data by comparing a digital representation of at least a portion of the electromagnetic waveform to mapping data.

Clause 15 includes the system of any of Clauses 11 to 14, where the one or more symbols include one or more bits of data in a header of a packet of a signal encoded in the electromagnetic waveform.

Clause 16 includes the system of any of Clauses 11 to 15, where the first machine-learning model comprises one or more decision trees, one or more neural networks, one or more support vector machines, or one or more prototypical networks.

Clause 17 includes the system of any of Clauses 11 to 16, further including one or more antennas coupled to the one or more interfaces.

Clause 18 includes the system of Clause 17, where the one or more antennas, the one or more interfaces, the one or more processors, and the one or more memory devices are integrated within an unmanned vehicle.

Additional Clauses describe a computer-readable storage device storing instructions that are executable by one or more processors to perform operations of any of Clauses 1 to 18 of the first set of interrelated clauses. For example, according to Clause 19, a computer-readable storage device storing instructions that are executable by one or more processors to perform operations. The operations include:

determining, based at least in part on parameters of a software-defined radio (SDR), waveform data descriptive of an electromagnetic waveform; generating feature data based on the waveform data and one or more symbols decoded from the electromagnetic waveform; and providing the feature data as input to a first machine-learning model and initiating a response action based on an output of the first machine-learning model.

Clause 20 includes the computer-readable storage device of Clause 19, where the operations further include, before generating the feature data, determining that at least a portion of the electromagnetic waveform encodes a signal by providing a digital representation of at least the portion of the electromagnetic waveform as input to a fourth machine-learning model that is trained to detect signals in electromagnetic waveforms.

Clause 21 includes the computer-readable storage device of either of Clauses 19 or 20, where the operations further include providing data based on the output of the first machine-learning model as input to a fifth machine-learning model, wherein the fifth machine-learning model is configured to select the response action from among a plurality of available response actions based on device type of a device that generated at least a portion of the electromagnetic waveform.

Additional aspects of the disclosure are described below in a second set of interrelated clauses:

According to Clause 1, a method includes: determining, based at least in part on parameters of a software-defined radio (SDR), waveform data descriptive of an electromagnetic waveform; generating feature data based on the waveform data; providing the feature data as input to a first machine-learning model to predict a future action of a device associated with at least a portion of the electromagnetic waveform; and initiating a response action based on the predicted future action.

Clause 2 includes the method of Clause 1, further including selecting the parameters of the SDR using a second machine-learning model that is trained to tune the SDR to scan an electromagnetic spectrum for waveforms of interest.

Clause 3 includes the method of either of Clauses 1 or 2, further including determining the waveform data by providing a digital representation of at least a portion of the electromagnetic waveform as input to a third machine-learning model that is trained to generate the waveform data.

Clause 4 includes the method of either of Clauses 1 or 2, further including determining the waveform data by comparing a digital representation of at least a portion of the electromagnetic waveform to mapping data.

Clause 5 includes the method of any of Clauses 1 to 4, where the predicted future action includes transmission of a signal and initiating the response action comprises initiating transmission of a jamming signal based on a predicted characteristics of the signal.

Clause 6 includes the method of any of Clauses 1 to 5, where initiating the response action includes storing data indicating a predicted future position or movement direction associated with the device.

Clause 7 includes the method of any of Clauses 1 to 6, where initiating the response action includes transmitting a command to one or more peer devices to initiate a swarm response to the device.

Clause 8 includes the method of any of Clauses 1 to 7, where the response action includes estimating a future position of the device and directing response resources based on the estimated future position.

Clause 9 includes the method of any of Clauses 1 to 8, where the first machine-learning model includes one or more decision trees, one or more neural networks, one or more support vector machines, or one or more prototypical networks.

Additional Clauses describe a system configured to perform one or more of the operations of any of Clauses 1 to 9 of the second set of clauses. For example, according to Clause 10, a system includes: one or more interfaces configured to receive an electromagnetic waveform; one or more processors; and one or more memory devices accessible to the one or more processors. The one or more memory devices storing instructions that are executable by the one or more processors to cause the one or more processors to: determine, based at least in part on parameters of a software-defined radio (SDR), waveform data descriptive of the electromagnetic waveform; generate feature data based on the waveform data; provide the feature data as input to a first machine-learning model to predict a future action of a device associated with at least a portion of the electromagnetic waveform; and initiate a response action based on the predicted future action.

Clause 11 includes the system of claim 10, where initiating the response action includes storing data indicating a predicted future position or movement direction associated with the device.

Clause 12 includes the system either of Clauses 10 or 11, where initiating the response action includes transmitting a command to one or more peer devices to initiate a swarm response to the device.

Clause 13 includes the system of any of Clauses 10 to 12, where the response action includes estimating a future position of the device and directing response resources based on the estimated future position.

Clause 14 includes the system of any of Clauses 10 to 13, where the first machine-learning model comprises one or more decision trees, one or more neural networks, one or more support vector machines, or one or more prototypical networks.

Clause 15 includes the system of any of Clauses 10 to 14, further including one or more antennas coupled to the one or more interfaces.

Clause 16 includes the system of any of Clauses 10 to 15, where the one or more interfaces, the one or more processors, and the one or more memory devices are integrated within an unmanned vehicle.

Clause 17 includes the system of any of Clauses 10 to 16, where the device corresponds to a target recipient of a signal encoded in the electromagnetic waveform.

Clause 18 includes the system of any of Clauses 10 to 16, where the device corresponds to a transmitter of a signal encoded in the electromagnetic waveform.

Additional Clauses describe a computer-readable storage device storing instructions that are executable by one or more processors to perform operations of any of Clauses 1 to 18 of the second set of interrelated clauses. For example, according to Clause 19, a computer-readable storage device storing instructions that are executable by one or more processors to perform operations. The operations include: determining, based at least in part on parameters of a software-defined radio (SDR), waveform data descriptive of an electromagnetic waveform; generating feature data based on the waveform data; providing the feature data as input to a first machine-learning model to predict a future action of a device associated with at least a portion of the electromagnetic waveform; and initiating a response action based on the predicted future action.

Clause 20 includes the computer-readable storage device of Clause 19, where the operations further include, before generating the feature data, determining that the portion of the electromagnetic waveform encodes a signal by providing a digital representation of at least the portion of the electromagnetic waveform as input to a fourth machine-learning model that is trained to detect signals in electromagnetic waveforms.

Further aspects of the disclosure are described below in a third set of interrelated clauses:

According to Clause 1, a method includes: determining, based at least in part on parameters of a software-defined radio (SDR), waveform data descriptive of an electromagnetic waveform; obtaining sensor data distinct from the waveform data; generating feature data based on the sensor data and the waveform data; and providing the feature data as input to a first machine-learning model and initiating a response action based on an output of the first machine-learning model.

Clause 2 includes the method of Clause 1, further including selecting the parameters of the SDR using a second machine-learning model that is trained to tune the SDR to scan an electromagnetic spectrum for waveforms of interest.

Clause 3 includes the method of either of Clauses 1 or 2, further including determining the waveform data by providing a digital representation of at least a portion of the electromagnetic waveform as input to a third machine-learning model that is trained to generate the waveform data.

Clause 4 includes the method of either of Clauses 1 or 2, further including determining the waveform data by comparing a digital representation of at least a portion of the electromagnetic waveform to mapping data.

Clause 5 includes the method of any of Clauses 1 to 4, where the response action includes initiating transmission of a jamming signal.

Clause 6 includes the method of any of Clauses 1 to 5, where the response action includes storing location data indicating a location associated with reception of the electromagnetic waveform.

Clause 7 includes the method of any of Clauses 1 to 6, where the response action includes sending a command to initiate a swarm response.

Clause 8 includes the method of any of Clauses 1 to 7, where the response action includes estimating a future position of a device that generated at least a portion of the electromagnetic waveform based on the waveform data, the sensor data, or both, and directing response resources based on the estimated future position.

Clause 9 includes the method of any of Clauses 1 to 8, where the first machine-learning model includes one or more decision trees, one or more neural networks, one or more support vector machines, or one or more prototypical networks.

Clause 10 includes the method of any of Clauses 1 to 9, where the sensor data is determined by one or more of a camera, a ranging system, or a sound transducer.

Clause 11 includes the method of any of Clauses 1 to 10, where the waveform data is generated by a first device and the sensor data is generated by a second device that is remote from the first device.

Additional Clauses describe a system configured to perform one or more of the operations of any of Clauses 1 to 11 of the second set of clauses. For example, according to Clause 12, a system includes: one or more interfaces configured to receive sensor data and an electromagnetic waveform; one or more processors; and one or more memory devices accessible to the one or more processors. The one or more memory devices storing instructions that are executable by the one or more processors to cause the one or more processors to: determining, based at least in part on parameters of a software-defined radio (SDR), waveform data descriptive of the electromagnetic waveform; generating feature data based on the sensor data and the waveform data; and providing the feature data as input to a first machine-learning model and initiating a response action based on an output of the first machine-learning model.

Clause 13 includes the system of Clause 12, further including one or more sensors coupled to the one or more interfaces to generate the sensor data.

Clause 14 includes the system of Clause 12, where the sensor data is received via a transmission from a remote device.

Clause 15 includes the system of any of Clauses 12 to 14, further including a propulsion system, where initiating the response action includes estimating a future position of a device associated with the electromagnetic waveform and moving toward the future position.

Clause 16 includes the system of any of Clauses 12 to 15, where initiating the response action includes estimating a future position of a device associated with the electromagnetic waveform and directing more peer devices to initiate a swarm response based on the estimated future position.

Clause 17 includes the system of Clause 16, where the device corresponds to a target recipient of a signal encoded in the electromagnetic waveform.

Clause 18 includes the system of Clause 16, where the device corresponds to a transmitter of a signal encoded in the electromagnetic waveform.

Clause 19 the system of any of Clauses 12 to 18, where the first machine-learning model includes one or more decision trees, one or more neural networks, one or more support vector machines, or one or more prototypical networks.

Clause 20 the system of any of Clauses 12 to 19, further including one or more antennas coupled to the one or more interfaces.

Clause 21 the system of any of Clauses 12 to 20, where the one or more interfaces, the one or more processors, and the one or more memory devices are integrated within an unmanned vehicle.

Additional Clauses describe a computer-readable storage device storing instructions that are executable by one or more processors to perform operations of any of Clauses 1 to 21 of the second set of interrelated clauses. For example, according to Clause 22, a computer-readable storage device storing instructions that are executable by one or more processors to perform operations. The operations include: determining, based at least in part on parameters of a software-defined radio (SDR), waveform data descriptive of an electromagnetic waveform; obtaining sensor data distinct from the waveform data; generating feature data based on the sensor data and the waveform data; and providing the feature data as input to a first machine-learning model and initiating a response action based on an output of the first machine-learning model.

Clause 23 includes the computer-readable storage device of claim 22, where the sensor data includes one or more of image data, video data, ranging data, or audio data.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   determining, based at least in part on parameters of a software-defined radio (SDR), waveform data descriptive of an electromagnetic waveform;
   generating feature data based on the waveform data and based on one or more symbols decoded from the electromagnetic waveform; and
   providing the feature data as input to a first machine-learning model and initiating a response action based on an output of the first machine-learning model; and
   providing data based on the output of the first machine-learning model as input to a fifth machine-learning model, wherein the fifth machine-learning model is configured to select the response action from among a plurality of available response actions based on device type of a device that generated at least a portion of the electromagnetic waveform.

2. The method of claim 1, further comprising selecting the parameters of the SDR using a second machine-learning model that is trained to tune the SDR to scan an electromagnetic spectrum for waveforms of interest.

3. The method of claim 1, further comprising determining the waveform data by providing a digital representation of at least a portion of the electromagnetic waveform as input to a third machine-learning model that is trained to generate the waveform data.

4. The method of claim 1, further comprising determining the waveform data by comparing a digital representation of at least a portion of the electromagnetic waveform to mapping data.

5. The method of claim 1, wherein the one or more symbols include one or more bits of data in a header of a packet of a signal encoded in the electromagnetic waveform.

6. The method of claim 1, wherein the response action comprises initiating transmission of a jamming signal.

7. The method of claim 1, wherein the response action comprises storing location data indicating a location associated with reception of the electromagnetic waveform.

8. The method of claim 1, wherein the response action comprises sending a command to initiate a swarm response.

9. The method of claim 1, wherein the response action comprises estimating, based on the waveform data, a future position of a device that generated at least a portion of the electromagnetic waveform and directing response resources based on the estimated future position.

10. The method of claim 1, wherein the first machine-learning model comprises one or more decision trees, one or more neural networks, one or more support vector machines, or one or more prototypical networks.

11. A system comprising:
    one or more interfaces configured to receive an electromagnetic waveform;
    one or more processors; and
    one or more memory devices accessible to the one or more processors, the one or more memory devices storing instructions that are executable by the one or more processors to cause the one or more processors to:
       determine, based at least in part on parameters of a software-defined radio (SDR), waveform data descriptive of the electromagnetic waveform;
       determine that at least a portion of the electromagnetic waveform encodes a signal by providing a digital representation of at least the portion of the electromagnetic waveform as input to a fourth machine-learning model that is trained to detect signals in electromagnetic waveforms;
       generate feature data based on the waveform data and based on one or more symbols decoded from the electromagnetic waveform; and
       provide the feature data as input to a first machine-learning model and initiating a response action based on an output of the first machine-learning model.

12. The system of claim 11, wherein the instructions are executable by the one or more processors to cause the one or more processors to select the parameters of the SDR using a second machine-learning model that is trained to tune the SDR to scan an electromagnetic spectrum for waveforms of interest.

13. The system of claim 11, wherein the instructions are executable by the one or more processors to cause the one or more processors to determine the waveform data by providing a digital representation of at least a portion of the electromagnetic waveform as input to a third machine-learning model that is trained to generate the waveform data.

14. The system of claim 11, wherein the instructions are executable by the one or more processors to cause the one or more processors to determine the waveform data by comparing a digital representation of at least a portion of the electromagnetic waveform to mapping data.

15. The system of claim 11, wherein the one or more symbols include one or more bits of data in a header of a packet of a signal encoded in the electromagnetic waveform.

16. The system of claim 11, wherein the first machine-learning model comprises one or more decision trees, one or more neural networks, one or more support vector machines, or one or more prototypical networks.

17. The system of claim 11, further comprising one or more antennas coupled to the one or more interfaces.

18. The system of claim 17, wherein the one or more antennas, the one or more interfaces, the one or more processors, and the one or more memory devices are integrated within an unmanned vehicle.

19. A computer-readable storage device storing instructions that are executable by one or more processors to perform operations comprising:
    selecting parameters of a software-defined radio (SDR) using a second machine-learning model that is trained to tune the SDR to scan an electromagnetic spectrum for waveforms of interest;
    determining, based at least in part on the parameters, waveform data descriptive of an electromagnetic waveform;
    generating feature data based on the waveform data and based on one or more symbols decoded from the electromagnetic waveform; and
    providing the feature data as input to a first machine-learning model and initiating a response action based on an output of the first machine-learning model.

20. The computer-readable storage device of claim 19, wherein the operations further comprise, before generating the feature data, determining that at least a portion of the electromagnetic waveform encodes a signal by providing a digital representation of at least the portion of the electromagnetic waveform as input to a fourth machine-learning model that is trained to detect signals in electromagnetic waveforms.

21. The computer-readable storage device of claim 19, wherein the operations further comprise providing data based on the output of the first machine-learning model as input to a fifth machine-learning model, wherein the fifth machine-learning model is configured to select the response action from among a plurality of available response actions based on device type of a device that generated at least a portion of the electromagnetic waveform.

* * * * *